US009399185B2

(12) United States Patent
Bromberg et al.

(10) Patent No.: US 9,399,185 B2
(45) Date of Patent: Jul. 26, 2016

(54) METHOD AND SYSTEM FOR CONTROLLING FILTER OPERATION

(71) Applicant: Filter Sensing Technologies, Inc., Cambridge, MA (US)

(72) Inventors: Leslie Bromberg, Sharon, MA (US); Alexander Sappok, Cambridge, MA (US); Peter Koert, Boston, MA (US)

(73) Assignee: CTS Corporation, Elkhart, IN (US)

( * ) Notice: Subject to any disclaimer, the term of this patent is extended or adjusted under 35 U.S.C. 154(b) by 341 days.

(21) Appl. No.: 13/743,712

(22) Filed: Jan. 17, 2013

(65) Prior Publication Data

US 2013/0125745 A1   May 23, 2013

Related U.S. Application Data

(60) Division of application No. 12/609,428, filed on Oct. 30, 2009, now Pat. No. 8,384,397, which is a continuation-in-part of application No. 11/741,832, filed on Apr. 30, 2007, now Pat. No. 7,679,374.

(60) Provisional application No. 60/746,081, filed on May 1, 2006, provisional application No. 61/109,922, filed on Oct. 31, 2008.

(51) Int. Cl.
*G01R 27/32* (2006.01)
*B01D 46/44* (2006.01)
(Continued)

(52) U.S. Cl.
CPC .............. *B01D 46/44* (2013.01); *F01N 3/025* (2013.01); *F01N 3/035* (2013.01); *F01N 3/106* (2013.01);
(Continued)

(58) Field of Classification Search
CPC ....... F01N 3/106; F01N 9/002; F01N 13/009; F01N 2370/22; F01N 2560/05; F01N 2560/12; F01N 2560/14; F01N 2900/0422; F01N 2900/1606; F01N 2560/06; B01D 46/444; Y02T 10/47
USPC .......................................................... 324/636
See application file for complete search history.

(56) References Cited

U.S. PATENT DOCUMENTS 4,024,452 A   5/1977   Seidel
4,042,879 A   8/1977   Ho et al.
(Continued)

FOREIGN PATENT DOCUMENTS

CN   1032238 A     4/1989
CN   101078692 A   11/2007
(Continued)

OTHER PUBLICATIONS

European Search Report mailed Jun. 11, 2013 in co-pending European patent application No. 07761557.3.
(Continued)

*Primary Examiner* — Benjamin M Baldridge
(74) *Attorney, Agent, or Firm* — Daniel Deneufbourg

(57) ABSTRACT

A particulate filter control system and method for controlling the same is disclosed. The particulate filter load monitoring system may transmit radio frequency signals through the resonant cavity and filter medium across a frequency range sufficient to generate more than one resonant mode. The system may contain additional sensors for monitoring additional exhaust characteristics and parameters. Further, a control unit may be configured to determine the amount of material accumulated in the particulate filter, detect failures and malfunctions of the exhaust after-treatment system and its associated components, and initiate an action based on the amount of material accumulated in the particulate filter, the determination of a system failure or malfunction, or input from one or more exhaust sensors.

12 Claims, 18 Drawing Sheets

(51) Int. Cl.
*F01N 3/025* (2006.01)
*F01N 3/035* (2006.01)
*F01N 3/10* (2006.01)
*F01N 9/00* (2006.01)
*F01N 13/00* (2010.01)

(52) U.S. Cl.
CPC ............. *F01N 9/002* (2013.01); *F01N 13/009* (2014.06); *F01N 2370/22* (2013.01); *F01N 2560/05* (2013.01); *F01N 2560/06* (2013.01); *F01N 2560/12* (2013.01); *F01N 2560/14* (2013.01); *F01N 2900/0422* (2013.01); *F01N 2900/1606* (2013.01); *Y02T 10/47* (2013.01)

(56) References Cited

U.S. PATENT DOCUMENTS

| | | | | |
|---|---|---|---|---|
| 4,477,771 | A * | 10/1984 | Nagy | F01N 9/002 324/636 |
| 4,689,553 | A * | 8/1987 | Haddox | F15B 15/28 324/635 |
| 5,074,112 | A * | 12/1991 | Walton | F01N 3/028 60/275 |
| 5,142,595 | A | 8/1992 | Chester | |
| 5,157,340 | A * | 10/1992 | Walton | F01N 9/002 324/641 |
| 5,369,369 | A | 11/1994 | Cutmore | |
| 5,423,180 | A | 6/1995 | Nobue et al. | |
| 5,497,099 | A * | 3/1996 | Walton | B01D 46/46 324/639 |
| 5,500,599 | A | 3/1996 | Stange | |
| 6,131,386 | A * | 10/2000 | Trumble | F01N 3/202 333/135 |
| 6,147,503 | A | 11/2000 | Nelson et al. | |
| 6,507,308 | B1 | 1/2003 | Ono et al. | |
| 6,819,849 | B1 | 11/2004 | Tangonan et al. | |
| 6,854,261 | B2 | 2/2005 | Williamson et al. | |
| 7,157,919 | B1 * | 1/2007 | Walton | F01N 9/002 324/639 |
| 7,357,822 | B2 | 4/2008 | Hamahata et al. | |
| 7,679,374 | B2 | 3/2010 | Bromberg et al. | |
| 8,384,396 | B2 | 2/2013 | Bromberg et al. | |
| 8,384,397 | B2 | 2/2013 | Bromberg et al. | |
| 8,889,221 | B2 * | 11/2014 | Sappok | B01D 39/2093 427/237 |
| 9,144,831 | B2 * | 9/2015 | Sappok | B08B 7/02 |
| 2001/0003898 | A1 | 6/2001 | Miller et al. | |
| 2001/0007571 | A1 | 7/2001 | Murphy et al. | |
| 2004/0200198 | A1 | 10/2004 | Inoue et al. | |
| 2006/0027511 | A1 | 2/2006 | Brown et al. | |
| 2006/0070373 | A1 * | 4/2006 | Huang | F01N 3/023 60/286 |
| 2006/0101793 | A1 | 5/2006 | Gregoire et al. | |
| 2006/0229466 | A1 | 10/2006 | Arhancet et al. | |
| 2007/0000218 | A1 | 1/2007 | Wirth et al. | |
| 2007/0056274 | A1 * | 3/2007 | Wills | F01N 3/0231 60/297 |
| 2007/0068157 | A1 | 3/2007 | Kurtz | |
| 2007/0125075 | A1 * | 6/2007 | Zanini-Fisher | F01N 11/00 60/297 |
| 2007/0125349 | A1 | 6/2007 | Zanini-Fisher et al. | |
| 2007/0130923 | A1 | 6/2007 | Dye et al. | |
| 2007/0209333 | A1 | 9/2007 | Kondou | |
| 2007/0214862 | A1 * | 9/2007 | Kubinski | F01N 13/008 73/1.06 |
| 2008/0059093 | A1 * | 3/2008 | Bromberg | F01N 9/002 702/76 |
| 2008/0066621 | A1 | 3/2008 | Naito et al. | |
| 2008/0092499 | A1 | 4/2008 | Otsuka et al. | |
| 2008/0110143 | A1 | 5/2008 | Chen et al. | |
| 2008/0264036 | A1 | 10/2008 | Bellovary | |
| 2009/0038294 | A1 | 2/2009 | Anderson et al. | |
| 2010/0101409 | A1 * | 4/2010 | Bromberg | F01N 3/025 95/8 |
| 2010/0102828 | A1 * | 4/2010 | Bromberg | B01D 46/0086 324/639 |
| 2012/0138093 | A1 * | 6/2012 | Sappok | B01D 65/02 134/18 |
| 2013/0127478 | A1 | 5/2013 | Bromberg et al. | |
| 2014/0116028 | A1 * | 5/2014 | Sappok | F02D 41/029 60/274 |

FOREIGN PATENT DOCUMENTS

| | | |
|---|---|---|
| EP | 0356040 A2 | 2/1990 |
| JP | 4-505665 A | 10/1992 |
| WO | 92/02807 A1 | 2/1992 |
| WO | 93/05388 A1 | 3/1993 |
| WO | 00/50743 A1 | 8/2000 |
| WO | 2004/074670 A2 | 9/2004 |
| WO | 2005/093233 A1 | 10/2005 |
| WO | 2006/002037 A2 | 1/2006 |
| WO | 2007/130896 A2 | 11/2007 |

OTHER PUBLICATIONS

International Search Report/Written Opinion mailed Dec. 23, 2009 in corresponding PCT application No. PCT/US2009/062757.
International Preliminary Report on Patentability mailed May 12, 2011 in corresponding PCT application No. PCT/US2009/062757.
International Search Report/Written Opinion mailed Dec. 23, 2009 in co-pending PCT application No. PCT/US2009/062782.
International Preliminary Report on Patentability mailed May 12, 2011 in co-pending PCT application No. PCT/US2009/062782.
Chinese Communication, with English translation, issued Dec. 5, 2012 in co-pending Chinese patent application No. 200980143806.3.
International Search Report/Written Opinion mailed Feb. 19, 2008 in co-pending PCT application PCT/US07/67750.
International Preliminary Report on Patentability issued Nov. 4, 2008 in co-pending PCT application No. PCT/US2007/067750.
Office Action mailed Mar. 6, 2015 in co-pending U.S. Appl. No. 13/7436,691.
Notice of Allowance mailed Aug. 3, 2015 in co-pending U.S. Appl. No. 13/743,691.

\* cited by examiner

METHOD AND SYSTEM FOR CONTROLLING FILTER OPERATION

This application is a divisional of U.S. patent application Ser. No. 12/609,428, filed Oct. 30, 2009, which is a continuation-in-part of U.S. patent application Ser. No. 11/741,832 filed Apr. 30, 2007 (Now U.S. Pat. No. 7,679,374 issued Mar. 16, 2010), which claims the benefit of U.S. Provisional Patent Application 60/746,081, filed May 1, 2006, the disclosures of which are herein incorporated by reference in their entireties.

This application claims priority to U.S. Provisional Patent Application Ser. No. 61/109,922, filed Oct. 31, 2008, the disclosure of which is herein incorporated by reference in its entirety.

FIELD

This application generally relates to a particulate filter control system and means for modifying system and engine operation, and specifically to a particulate filter control system having a particulate filter load monitoring system.

BACKGROUND

Particulate filters are used in a wide range of applications to reduce particulate matter emissions from engines and other combustion sources. Particulate matter or soot emissions consist of solid- or liquid-phase aerosol particles and may be composed of carbon, sulfates, condensed organic components, and inorganic ash. Increasingly stringent particulate matter emission limits require significant reductions in particulate matter emissions. While improved combustion, cleaner fuels, and various in-cylinder strategies provide some reduction in particle emissions, particulate filters have emerged as one of the most effective means for meeting these stringent standards.

Control of particulate filter operation is critical to ensure proper filter and engine performance, minimize filter failures, and reduce the fuel economy penalty resulting from use of the filter. As particulate matter accumulates in the filter, exhaust flow is restricted and backpressure increases. This increased backpressure reduces engine fuel economy, and in severe cases, may cause engine malfunction or damage. In order to maintain acceptable engine operation, the filter is cleaned by oxidizing the particulate matter (regeneration). Filter regeneration may be either active or passive. In an active system, the exhaust temperature is increased by some external means, through the use of a burner, fuel injection over an oxidation catalyst, electric heater, or some other means. In a passive system, the filter may be regenerated through the use of a catalyst either on the filter itself, on a separate substrate, or introduced in the fuel. The catalyst promotes particulate matter oxidation at reduced exhaust temperatures. Accurate monitoring of filter loading is also important in passive systems to ensure the filter is functioning properly.

Accurate knowledge of material accumulation in the particulate filter is important to ensure proper filter regeneration. Excessive soot accumulation in the particulate filter may lead to high internal filter temperatures during regeneration, increasing filter thermal stress, and, in some cases, resulting in filter cracking or melting. On the other hand, regenerating the filter too frequently results in unnecessary fuel economy penalties. Precise measurement of filter loading is, therefore, required to optimize the regeneration strategy.

Aside from soot loading, ash also accumulates in particulate filters. Ash accumulation displaces soot, reducing the filter's soot storage capacity. Ash deposits may alter the distribution of the soot accumulated in the filter. Following extended use, the amount of ash accumulated in the particulate filter may significantly exceed the amount of soot and affect the filter's performance. It may be necessary to periodically remove the ash or replace the filter. Measurement of ash levels in the particulate filter is required to determine filter cleaning or replacement intervals and for accurate control of engine and filter operation.

In addition to monitoring filter loading to control filter and engine operation, it is also important to detect filter failures and malfunctions. Filter failures may occur via the formation of cracks or melting, for example. In some applications, on-board diagnostic requirements stipulate various systems be in place to detect particle leakage from the filter. Further, it may also be necessary to detect the failure or malfunction of individual components, such as sensors for example, required for the proper operation of the engine or after-treatment system. In still other cases, the filter monitoring system, in conjunction with other sensors, may be used to monitor exhaust emissions and provide information useful to modify engine operation based on actual exhaust emission levels, such as for closed loop combustion control.

Currently most Diesel Particulate Filter (DPF) load monitoring systems are based on exhaust pressure drop measurements in conjunction with various predictive models. Pressure drop measurements alone provide only an indirect and imprecise measure of material accumulation in the particulate filter, and suffer from a number of disadvantages. Exhaust gas composition, temperature, and flow rates all affect filter pressure drop and must be accounted for to accurately relate pressure drop to filter soot loading. Further, the distribution of the accumulated ash and soot also affects the pressure drop measurement, and this distribution may change with time, particularly as the filter becomes loaded with ash. Pressure drop measurements are also unable to distinguish between soot and ash accumulation in the filter, the latter of which introduces additional error in soot load estimates based on pressure drop. Additionally, many types of filters exhibit a non-linear pressure drop response and pressure drop hysteresis depending upon the loading state and history of the filter.

Pressure drop-based estimates of soot accumulation in the DPF are also characterized by generally slow response times and low sensitivities to small changes in soot load. Further, the inability of these systems to directly monitor ash levels in the filter requires the filters to be periodically inspected, resulting in vehicle or machine down-time, regardless of the actual filter ash level. Additionally, pressure-drop based measurements are unable to detect all but the most catastrophic of filter failures, and, in most cases, can not meet stringent on-board diagnostic requirements.

In order to address some of the shortcomings inherent to filter pressure drop measurements, various predictive models are generally used in conjunction with these measurements. While various types of models exist, many utilize a number of engine operating parameters, inputs from various engine and exhaust sensors, and the time between regeneration events, to predict the amount of soot accumulated in the DPF. In many cases, these models are uploaded in the engine control unit (ECU). These models are generally calibrated for a specific engine and fuel, requiring recalibration for each specific application. Furthermore, when used with cleaner burning fuels, (compared to the fuel with which the models were initially calibrated) the models tend to over-predict filter soot loading, resulting in unnecessary filter regenerations and fuel economy penalties. The combined use of predictive models and filter pressure drop measurements does little to overcome the deficiencies listed above. These shortcomings lead to inefficient system operation, fuel economy penalties, increased filter thermal cycling and fatigue, and reduced filter service life.

Exhaust gas soot sensors have also been proposed to measure the concentration of soot aerosols directly in the exhaust gas entering the particulate filter. These measurement systems suffer from the deficiency that the amount of soot accumulated on the particulate filter is not necessary equivalent to the amount of soot entering the filter, as some level of passive regeneration may take place, depending on exhaust conditions. Further, exhaust gas soot sensors provide no information on ash accumulation or soot and ash distribution in the DPF. In addition, many of these sensors suffer form soot fouling, consume excessive amounts of energy, and are subject to error introduced by exhaust temperature, exhaust gas velocity, and other factors.

Radio frequency (RF)-based particulate load monitoring systems have also been proposed. One such system monitors filter loading and initiates filter regeneration based on the magnitude of a low-frequency (RF) signal transmitted through the filter. This system, by restricting use to low frequencies below those required to establish resonance in a cavity, overlooks many of the advantages to utilizing higher frequencies required to generate multiple cavity resonant modes.

The use of microwaves to detect soot content in a particulate trap was also proposed. One such system detects soot content in a particulate filter by monitoring a change in filter resonant frequency. However, such systems cannot determine the spatial distribution of soot content within the particulate filter.

All RF and microwave filter load monitoring systems heretofore known suffer from a number of disadvantages:

(a) Prior art systems are unable to monitor the spatial distribution of material accumulated in the filter. Ash accumulation in the filter displaces soot and alters its distribution. Further, non-uniform flow conditions may also result in non-uniform material accumulation.

(b) All known filter load monitoring systems initiate filter regeneration based on some average total filter soot load. Locally high soot loads cannot be detected by systems that are not capable of measuring material distribution in the filter.

(c) Previous microwave- and RF-based filter loading systems cannot simultaneously detect both soot and ash accumulation in the filter over all exhaust conditions.

(d) These systems do not detect filter failures or malfunctions, which is important to ensure the filter is operating as required.

(e) These systems do not detect malfunctions or failures of individual components, such as sensors, for example, that may be required for correct operation of the filter.

(f) Microwave and RF-based measurement systems are strongly affected by moisture content and water vapor present in the exhaust gas and on the filter, which must be accounted for to reduce error in the measurement.

(g) Previous filter load monitoring systems fail to communicate with existing engine and exhaust sensors to provide feedback control capabilities useful to modify engine operation to optimize the combined engine and after-treatment system performance.

Therefore, it would be beneficial if there were a particulate filter load monitoring system that addressed the problems described above. Such a system would be advantageous in that lower emission limits may be achieved, while minimizing the amount of maintenance and unnecessary regeneration cycles. Such a system would be applicable not just for diesel engines but any engine or emission control application where a reduction in soot or particulate matter emissions is required. Further, the present disclosure relates not only a particulate filter load monitoring and control systems, but any type of filter, such as air filters, liquid filters, filter bag houses, and the like, where knowledge of filter loading, by contaminant material or some other matter, and control of filter operation are important.

SUMMARY

A particulate filter control system, having a filter load monitoring system, is disclosed. The system can be used to initiate and end filter regeneration, detect filter failures and malfunctions, determine ash cleaning requirements, and modify engine operation to optimize the combined engine and after-treatment system performance.

In certain embodiments, the control system includes a resonant cavity in which the filter is housed. Microwave resonance techniques are used to estimate the amount, spatial distribution and content of the loading, as well as detect failures and malfunctions. In some embodiments, sensors, such as moisture and temperature sensors are used to compensate for environmental variations.

In other embodiments, a plurality of sensors, such as soot sensors, oxygen sensors, temperature sensors, moisture sensors, NOx sensors and pressure sensors are used in conjunction with a control unit to estimate the loading of the filter.

In other embodiments, a combination of these approaches is used to determine filter loading. The control system then initiates regeneration based on the estimated filer loading. The control system is also able to detect filter failures, such as cracking, and alert the operator.

DETAILED DESCRIPTION

Figure 1:
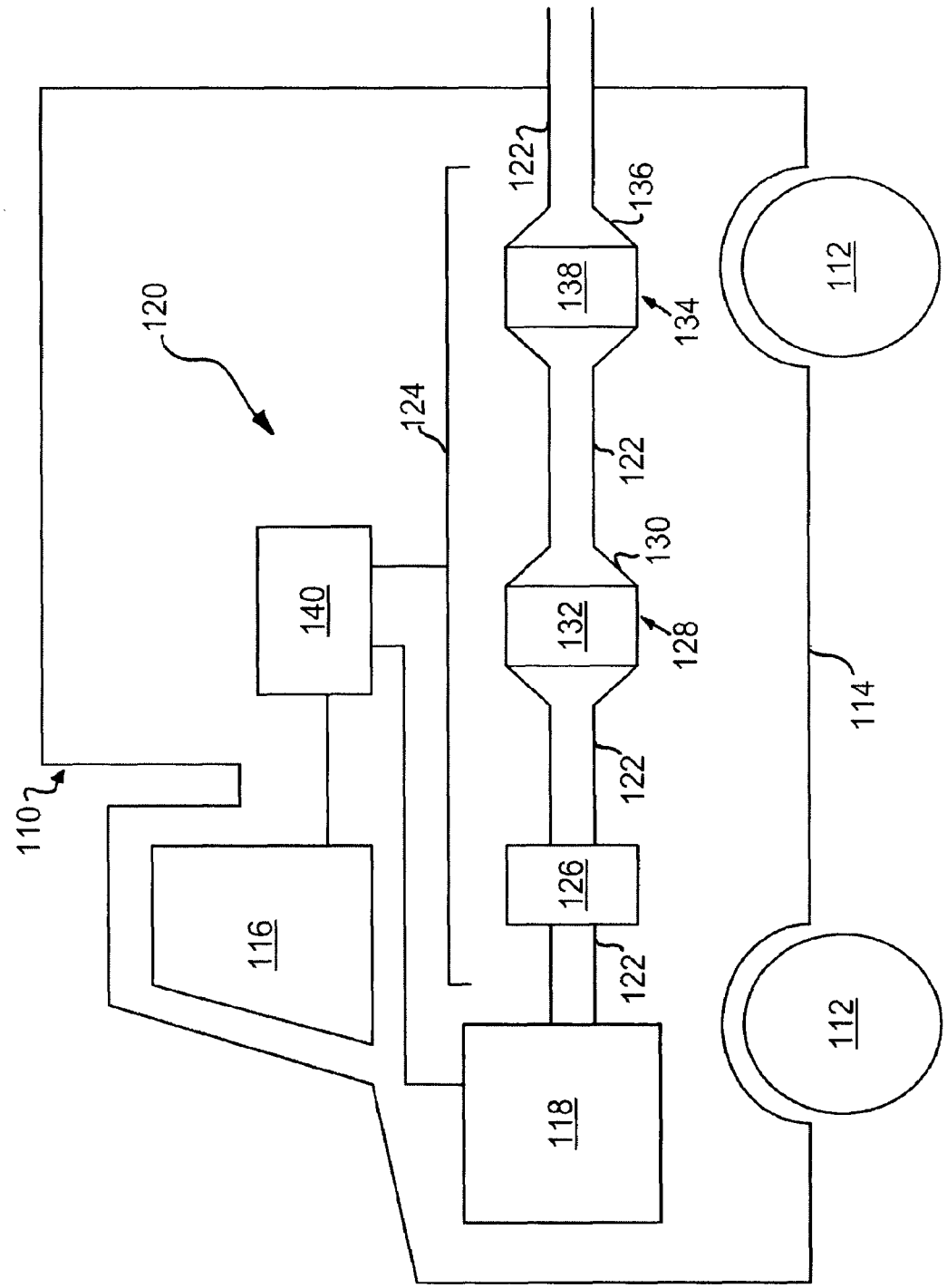
FIG. 1 shows a machine according to an exemplary embodiment.

FIG. 1 depicts a machine 110. The machine 110 may include a traction device 112 such as wheels, belts, tracks, or other means for self-propulsion. Alternatively, the machine 110 may be stationary or mounted in a fixed location. The machine 110 may also include a frame 114, an operator station 116, an engine 118, a particulate filter control system 120, and an exhaust after-treatment system 124. The exhaust after-treatment system 124 may be connected to the engine 118, which may be mounted to the frame 114 of the machine 110.

The engine 118 may be any type of engine that produces a flow of exhaust gases. For example, engine 118 may be an internal or external combustion engine. Specifically, engine 118 may be a diesel engine, gasoline engine, an engine burning gaseous fuel, such as natural gas or hydrogen, or any other engine. Alternatively, engine 118 may be a turbine, combustor, or burner that also produces exhaust gases.

The exhaust after-treatment system 124 may be connected to the engine via a conduit 122, which may also serve as a means for connecting the individual components comprising after-treatment system 124. In one embodiment, the exhaust after-treatment system 124 may include a regeneration device 126, a particulate filter assembly 128, a particulate filter control system 120, and a catalyst assembly 134. The regeneration device 126, particulate filter assembly 128, and catalyst assembly 134 may be connected by means of a conduit 122. For purposes of the following description, the catalyst assembly 134 may be referred to as a NOx reduction catalyst, but any suitable catalyst may be utilized. Catalyst assembly 134 may or may not be configured to reduce NOx.

The regeneration device 126 may be any device utilized to enhance exhaust conditions to promote filter 132 regeneration. In the case of a thermally regenerated filter 132, regeneration device 126 may increase the exhaust gas temperatures suitable for particulate filter 132 regeneration. Regeneration device 126 may be a burner assembly, an oxidation catalyst, or an electrical heating element, for example. The regeneration device 126 may be configured to increase the temperature of the exhaust gas directly or to heat the conduit 122 or particulate filter housing 130.

The NOx catalyst assembly 134 may include a housing 136 and a catalyst 138. The catalyst 138 may be any catalyst utilized to reduce the exhaust gas NOx content such as a lean NOx trap, selective catalytic reduction system, NOx adsorber catalyst, or three-way catalyst, for example, or any other type of catalyst. In another embodiment, catalyst 138 may not be a NOx reduction catalyst, but may be any catalyst. Catalyst assembly 134 may be located before or after the particulate filter assembly 128.

The particulate filter assembly 128 may include a housing 130 and a particulate filter 132. The particulate filter housing 130 may be designed in such a way so as to form a resonant chamber or cavity providing a means for confining a radio frequency signal. The housing 130 may be composed of metal or any material suitable for use in an exhaust system capable of confining radio frequency or microwave signals. The housing 130 may further be designed such as to optimize the resonant characteristics or control the resonant mode structure. The exhaust conduit 122 connected to the particulate filter housing 130 may be of a smaller diameter than the housing 130.

The particulate filter 132 contained within the particulate filter housing 130, may be composed of cordierite, silicon carbide, mullite, or any other material suitable for trapping and filtering particles from the exhaust of engine 118. The particulate filter 132 may be catalyzed or un-catalyzed. The filter 132 may be a filter element such as a porous media, configured in a wall-flow design, pleated design, or any other suitable filter material and design.

The particulate filter control system 120 interacts with the various components, and performs the functions described herein. The particulate filter control system 120 may also include a control unit 140. The control unit 140 may be a processing element, in communication with one or more memory elements. These memory elements may include RAM, DRAM, ROM, EPROM or any other storage mechanism. In addition, the memory elements may be volatile or non-volatile. In some embodiments, a non-volatile memory is used to store the instructions executed by the processing element, while a volatile memory is used to store temporary data. In addition to instructions, the memory elements may contain tables, algorithms, data, matrices and other information necessary to perform the desired functions. In addition, the control unit 140 may have input and output ports so as to communicate with the various other components located in machine 110. The control unit 140 may be configured to communicate with engine 118, operator station 116, exhaust after-treatment system 124, and the machine 110. The particulate filter control system 120 may be configured to monitor material loading in the particulate filter 132, monitor the location of the accumulated material in the particulate filter 132, initiate, control, and terminate regeneration, alert the operator when particulate filter 132 maintenance or replacement is required, detect particulate filter 132 failures and malfunctions, and modify engine 118 or after-treatment system 124 operation.

The particulate filter 132 material loading may be soot or ash or any other type of particulate matter, contaminant matter, or the like. The material loading may be conductive or non-conductive and it may be uniform or non-uniformly distributed in the DPF.

Although the after-treatment system 124 is shown to contain the regeneration device 126, particulate filter assembly 128, and NOx catalyst assembly 134 as separate components, in a specific order, these components may be combined or configured in a different order in any combination in various other embodiments. For example, in another embodiment the NOx catalyst 138 may be contained in the same housing 130 as the particulate filter 132 or the particulate filter 132 may be a multi-functional device designed to filter particulate matter and reduce other emissions, such as NOx for example, via the use of a catalytic coating applied to the particulate filter 132 or some other means.

Similarly, in yet another embodiment, the regeneration device 126 may be contained within the particulate filter housing 130. The NOx reduction catalyst assembly 134 may also be placed before or after the particulate filter assembly 128, for example. The after-treatment system 124 may also be connected to an exhaust gas recirculation system (not pictured), which may be low pressure or high pressure. The after-treatment system 124 may or may not contain all of the components shown in FIG. 1 or may contain additional components and subsystems, such as additional catalysts, injection systems such as for urea or fuel, for example, and other subsystems not pictured in FIG. 1 without departing from the after-treatment system 124 in its broader aspects.

The operation of the system shown in FIG. 1 will now be described. In one embodiment, the after-treatment system 124 and engine 118 may be controlled by the particulate filter control system 120. The particulate filter control system 120 may be configured to monitor particulate filter 132 soot loading or the distribution of the accumulated soot, and initiate regeneration when the soot loading reaches or exceeds some predetermined level. It may be necessary to regenerate the particulate filter 132, as material accumulation in the filter 132 may decrease engine 118 performance and/or possibly damage the engine 118 or after-treatment system 124.

The particulate filter control system 120 may initiate particulate filter 132 regeneration based on the total average soot load in the filter 132 or the local soot load in a specific region of the particulate filter 132. Precise measurement of the soot loading allows flexibility in the initiation and control of regeneration, depending on engine 118 conditions and operating history, for example, in order to minimize the fuel consumption and minimize thermal shock to the DPF 132.

The particulate filter 132 may be thermally regenerated. Regeneration may be initiated by the control unit 140 or by the operator from the operator station 116 or remotely. In one embodiment, regeneration may involve measures to raise the exhaust temperature. These measures may or may not require use of the regeneration device 126. In another embodiment, filter 132 regeneration may involve the modification of engine 118 operation and exhaust conditions, such as increased engine-out NOx levels, for example.

In some embodiments, the control unit 140 is able to modify engine 118 operations to achieve a number of different results. Since the engine 118 generates the input to the system (i.e. exhaust), changes to the engine 118 operation can effect the operation of the exhaust after-treatment system 124. For example, the control unit 140 may increase or limit the ratio of air to fuel in the engine 118. Alternatively, the operation of the air compressor may be modified. The controller 140 may also change the transmission gear ration so as to change the RPM and torque of the engine. In other embodiments, the timing of the spark or fuel injection relative to the piston compression cycle can be modified.

In one embodiment, the control unit 140 may modify engine 118 operation to increase exhaust gas temperatures. The control unit 140 may reduce airflow or modify the amount and timing of fuel injected, for example, to increase exhaust temperatures to levels suitable for particulate filter 132 regeneration. A variety of methods may be used to enrich the air/fuel ratio of the engine 118, which may increase exhaust gas temperatures. Operating the engine 118 at high load may also increase the exhaust gas temperatures.

The control unit 140 may also modify engine 118 operation to achieve an exhaust gas composition more favorable for particulate filter 132 regeneration. For example, the control unit 140 may modify engine 118 operation to increase engine-out NOx emissions, such as reducing EGR rates for example, to promote particulate filter 132 regeneration via $NO_2$.

The control unit 140 may also monitor exhaust conditions and the state of filter 132 loading with passively regenerated particulate filters 132. The control unit 140 may control engine 118 operation such that the particulate filter 132 is operating within a range of exhaust temperature and composition conditions over a sufficient fraction of the duty cycle necessary to ensure local or total soot loadings in filter 132 do not exceed acceptable levels.

In another embodiment, the regeneration device 126 may be employed to increase exhaust temperatures or enhance exhaust conditions and composition suitable for particulate filter 132 regeneration. In one embodiment, the regeneration device 126 may contain an oxidation catalyst. The oxidation catalyst may be configured to increase exhaust gas $NO_2$ levels upstream of the particulate filter 132 to promote particulate oxidation via $NO_2$. The oxidation catalyst may also be configured to oxidize hydrocarbons in the exhaust and thereby increase the exhaust gas temperature. The control unit 140 may be used to command late in-cylinder fuel injection in the engine 118 or fuel injection directly into the exhaust conduit 122 for example, as one means of increasing exhaust hydrocarbon content upstream of the regeneration device 126 for regeneration.

In yet another embodiment, the regeneration device 126 may be a burner assembly or combustor configured to increase the exhaust gas temperature by producing a flame. An electrical heating element or microwave heating system may also be used as a regeneration device 126 to heat the exhaust gas or the particulate matter accumulated on the particulate filter 132 directly.

The particulate filter control system 120 may also be configured to monitor the regeneration process and terminate the regeneration event. The system 120 and control unit 140 may adjust the engine 118 or regeneration device 126 operation to control filter 132 regeneration rate. Control of filter 132 regeneration rate may be useful to minimize thermal stress on the particulate filter 132 during the regeneration event or limit the maximum temperature achieved in the particulate filter 132, for example. The particulate filter control system 120 may terminate the regeneration event when the filter 132 loading level is reduced to some acceptable value, or after a predetermined period of time, for example.

The particulate filter control system 120 may also be configured to monitor ash levels and the distribution of the ash inside the particulate filter 132. The control unit 140 may trigger an alarm or modify engine 118 operation once ash levels reach or exceed some threshold value. The alarm may be used to alert the operator to clean the ash from the filter 132 or replace the particulate filter 132, for example.

The health or state of the particulate filter 132 may also be monitored by the particulate filter control system 120. The control system 120 may be used to detect filter 132 failures, such as cracking or melting and other malfunctions, which would result in particulate matter escaping from the filter 132. The particulate filter control system 120 may also be configured to execute diagnostic functions to confirm that the after-treatment system 124 is functioning properly. In the event that the particulate filter control system 120 detects a failure or malfunction, the event may be recorded and stored in the control unit 140 and an alarm may be triggered. The failure or malfunction may be related to the filter 132, NOx catalyst 138, regeneration device 126, sensors, or other components. Depending on the type of failure or malfunction, the control unit 140 may also modify engine 118 or after-treatment system 124 operation so as to prevent damage to the engine 118, after-treatment system 124, machine 110, or to prevent the escape or creation of excessive emissions.

Figure 2:
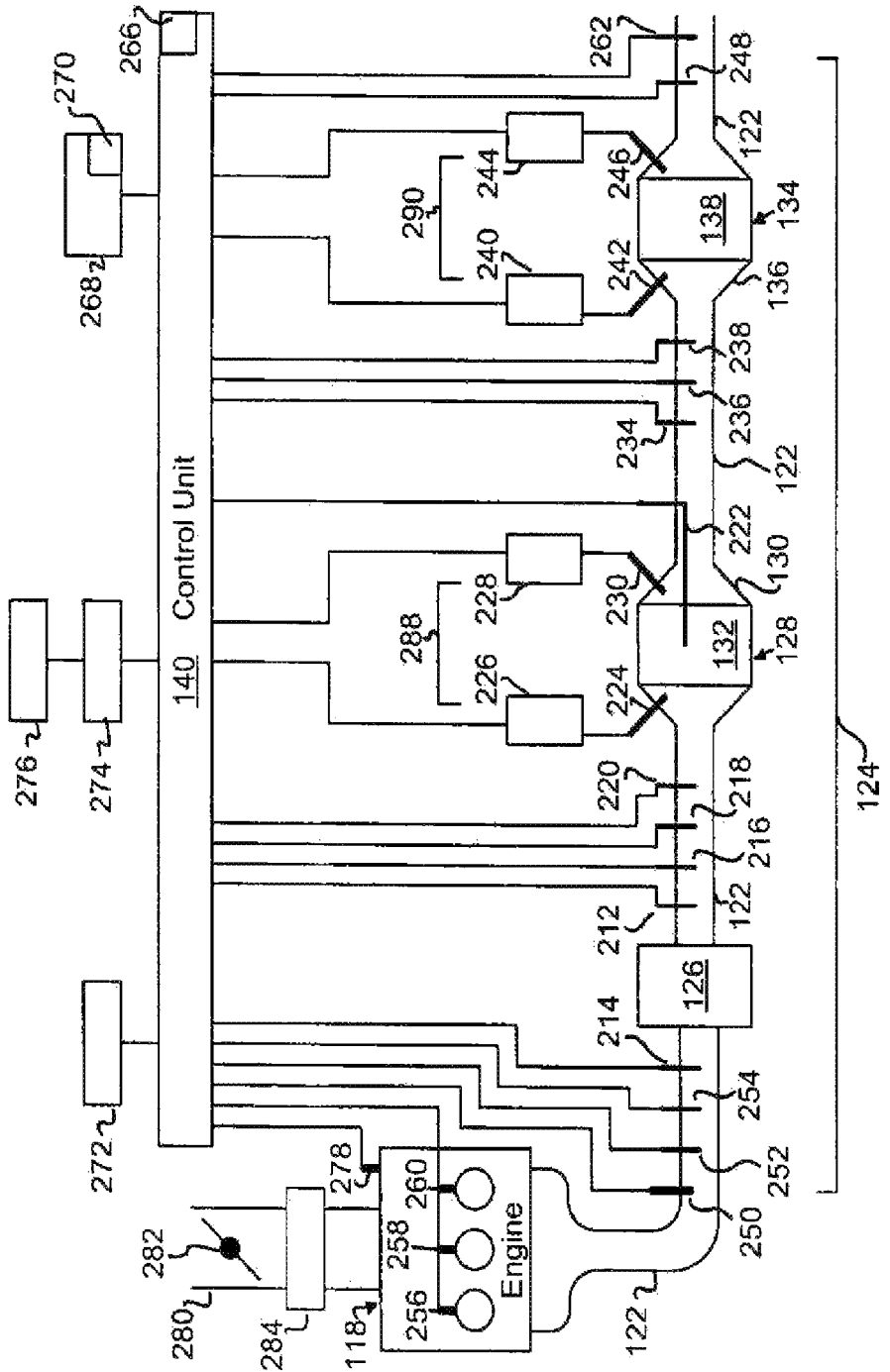
FIG. 2 shows a particulate filter control system according to an exemplary embodiment.

An exemplary embodiment of an exhaust after-treatment system 124 containing a particulate filter control system 120 is illustrated in FIG. 2. The control system 120 is connected to an engine 118. After-treatment system 124 may be connected to engine 118 by means of a conduit 122, and include a regeneration device 126, a particulate filter assembly 128, and a catalyst assembly 134. In some embodiments, the particulate filter housing 130 and catalyst housing 136 may be designed to act as resonant cavities or chambers. The after-treatment system 124 may be instrumented with a number of sensors, which are controlled by and provide input to the control unit 140. The control unit 140 may be an engine control unit, ECU, or a stand-alone control unit. There may be more than one control unit 140. In one embodiment control unit 140 may include a Controller Area Network (CAN) interface, or similar, to allow for communication with other control units and machine 110 systems. Other suitable data-links or communication formats may also be used.

The engine 118 may include a fuel supply system (not shown), an air intake system 280, a throttle 282, and a compressor 284.

As described above, the after-treatment system shown in FIG. 2 is not the only embodiment that can be used. For example, regeneration device 126 may be combined with particulate filter assembly 128. Also, catalyst assembly 134 can be combined with particulate filter assembly 128. The particulate filter control system 120 may include a temperature sensor 252, NOx sensor 254, and oxygen sensor 214 mounted downstream of the engine 118 and upstream of the after-treatment system 124 to monitor engine-out exhaust temperature, NOx levels, and oxygen levels. A fuel injector 250 may be mounted on the conduit 122 and configured to inject fuel into the exhaust upstream of the regeneration device 126. The regeneration device 126 may be burner or combustor designed to burn the fuel injected from injector 250 or regeneration device 126 may be an oxidation catalyst. Injectors 256, 258, and 260 mounted on the engine assembly 118 may also provide fuel for filter 132 regeneration. The regeneration device 126 may or may not require fuel to function. For example, the regeneration device 126 may be an electrical heater.

Exhaust pressure sensors 212 and 238, temperature sensors 216 and 236, and soot sensors 218 and 234 are also shown mounted upstream and downstream of the particulate filter assembly 128. The exhaust pressure sensor 212 may measure exhaust backpressure. Together exhaust pressure sensors 212 and 238 may constitute a pressure drop measurement system, or pressure sensors 212 and 238 may be replaced by a single differential pressure sensor. Soot sensors 218 and 234 may be of any type suitable for monitoring particulate matter levels in the exhaust gas. Soot sensor 218 may be configured to monitor engine-out soot emissions, which may be useful for estimating the amount of soot accumulated in the particulate filter 132. Soot sensor 234 mounted downstream of the particulate filter assembly 128 may measure the amount particulate matter passing through the particulate filter 132 and detect filter 132 malfunctions and failures. Soot sensors 218 and 234 may measure soot on a mass or number basis.

The particulate filter control system 120 may include one or more radio frequency probes 224 and 230 configured to transmit and receive radio frequency signal through the particulate filter 132. Probes 224 and 230 may me mounted on particulate filter housing 130. The filter housing 130 may be designed to form a resonant cavity and provide a means for containing the radio frequency signal, such as a metal enclosure. The housing 130 may have one or more openings to allow for exhaust flow, the openings generally being smaller than the enclosure, in one embodiment.

In one embodiment, an RF signal generator 226 may be connected to probe 224 to generate and transmit a signal through particulate filter 132 contained within particulate filter housing 130. The signal generator 226 may be a voltage controlled oscillator, for example. Probe 230 may be connected to a signal detector 228 designed to receive the RF signal transmitted through filter 132 by probe 224. The signal detector 228 may be a diode, such as a Schottky diode for example, or other suitable detector, and may also contain electronics for modifying the received signal such as amplifiers or filters, for example. The RF signal generator 226 may be controlled by the control unit 140. The control unit 140 may also receive the RF signal from the detector 228. In another embodiment, signal generator 226 and detector 228 may be integrated in a single RF circuit chip (not shown). The signal generator 226 and detector 228 may be separate components or integrated into the control unit 140. Together, the signal generator 226, detector 228, and RF probes 224 and 230 may constitute a radio frequency filter load measurement system 288. Control unit 140 may include instructions, tables, models or other information, which can be used in conjunction with the radio frequency filter load measurement system 288. For example, these components may be used to supply energy to a cavity 130 and detect the response. Based on that received response, the control unit 140 may determine the filter 132 loading.

Probes 224 and 230 may be on the same or opposite sides of the particulate filter 132. Mounting probes 224 and 230 on the downstream side of the particulate filter 132 may prevent particle deposition on the probes and improve system performance. Particulate filter system 128 need not contain two probes 224 and 230 but may use only one probe 224 or 230 for launching and receiving the RF signal, using a reflection mode. Particulate filter system 128 may also contain more than two probes in any number of configurations. Probes 224 and 230 may be positioned in the particulate filter housing 130 but outside the particulate filter 132 or inside the particulate filter 132. Probes 224 and 230 may be rod antennas, loop antennas, waveguides, or any other design suitable for transmitting and receiving RF signals in the filter housing 130. Probes 224 and 230 may be used in reflection, transmission, or transmission and reflection modes.

In other embodiments, particulate filter assembly 128 houses the particulate filter 132 and does not include means to measure loading using RF signals. In these embodiments, particulate filter assembly 128 may not be designed to function as a resonant cavity. Similarly catalyst housing 136 may or may not include means to monitor the catalyst 138 using RF signals and housing 136 may or may not be designed to function as a resonant cavity.

A moisture sensor 220 may also be positioned upstream of the particulate filter 132 to monitor the amount of water vapor in the exhaust. One or more temperature probes 222 may be mounted inside the particulate filter 132.

The catalyst assembly 134 may also include a system of RF probes 242 and 246, signal generator 240, and detector 244, which together may constitute an RF catalyst monitoring system 290. Probes 242 and 246 may be of any design suitable for transmitting and receiving RF signals in the catalyst assembly 134, the housing 136 of which is designed to function as a resonant cavity. A catalyst 138 may be contained within housing 134. Probes 242 and 246 may be of any number and configuration relative to the catalyst assembly 134. A NOx sensor 248 and ammonia sensor 262 may be mounted downstream of the catalyst assembly 134. In some embodiments, the catalyst 138 is a NOx catalyst. However, in other embodiments, the catalyst 138 need not be a NOx catalyst, but may be any catalyst.

While FIG. 2 shows a plurality of sensors and resonant cavities, it is understood that not all embodiments will have all of the components detailed above. For example, in one embodiment, the housings do not serve as resonant cavities and all of the function described herein are done based on readings from one or more sensors. In other embodiments, some of the previously described sensors are not included. For example, in one embodiment, the after-treatment system 124 may not include a NOx sensor 248 or ammonia sensor 262. FIG. 2 is intended to illustrate the types of sensors and devices that can be employed in the present system, however, it is not intended to limit the embodiments to only those having all such sensors and devices.

The particulate filter control system 120 may also include additional sensors such as an engine speed sensor 278 and a ground speed sensor 272. The control unit 140 may control and acquire inputs from all of the sensors previously described and shown in FIG. 2, and may serve as the processing engine for monitoring the amount, location, and type of material accumulated in filter 132, detecting system failures, and initiating, controlling, and ending filter 132 regeneration. The control unit 140 may also include an internal or external timer 266. The control unit 140 may further be connected to a display 268 which may contain an indicator 270, such as a lamp or buzzer. A data link 274 may be used to connect the control unit 140 to an external device, such as an external computer or scan tool 276. The scan tool 276 may be useful to provide external users access to the control unit 140, such as to view and reset faults or modify and upload calibrations or algorithms, for example.

The operation of the particulate filter control system 120 shown in FIG. 2 will now be described. The control unit 140 may control and acquire signals from the various sensors depicted in FIG. 2 to monitor and control the engine 118 and after-treatment system 124 operation. In one embodiment, the particulate filter control 120 system monitors filter loading 132 using radio frequencies. The filter 132 loading can be soot, ash, or any other particulate matter. The control unit 140 may control the operation of the signal generator 226 to generate an RF signal over a frequency range. The frequency range can be any range suitable for generating multiple resonant modes in the filter housing 130 serving as a resonant cavity.

In one embodiment, the housing 130 may be of a cylindrical shape, having two end cones connected to the conduit 122. The cylindrical portion of the housing 130 may have a diameter of 5.66 inches and a length of 6 inches. A suitable frequency range for this cavity may be from 1 GHz to 2 GHz. Any housing 130 size and any frequency range suitable for generating one or more than one resonant mode in the housing 130 may be used.

The RF signal generated by the signal generator 226 may be introduced in the housing 130 and transmitted through the filter 132 by probe 224. The signal, thus transmitted, may be received by probe 230, and detected by detector 228. The detected signal may then be received by the control unit 140. In this manner, the particulate filter control system 120 may sample the resonance curves over a given frequency range for the filter 132 contained within housing 130.

Control unit 140 may compute various signal parameters from the resonance curves thus sampled. Instructions for computing the signal parameters and statistics may be uploaded and stored in the control unit 140 on a computer readable storage medium, such as a storage element. The system may also determine the signal parameters using analog means. The system may utilize predetermined rules, or may be adaptive, such as an expert system. Typical signal parameters may include amplitude, frequency, peak width, or quality factor of one or more resonance modes. Control unit 140 may determine the parameters listed above for one cycle (sweep of the frequency range) or after acquiring and averaging the signal over multiple cycles. In some cases, it may be desirable to acquire multiple cycles and compute various signal statistics for each of the values described above such as mean, median, mode, and standard deviation, for example. These signal parameters and statistics may be used by the system to determine the amount, location, and type of material collected in filter 132 and also to detect filter 132 or system 120 failures, or to control engine 118 operation or filter 132 regeneration.

Figure 11:
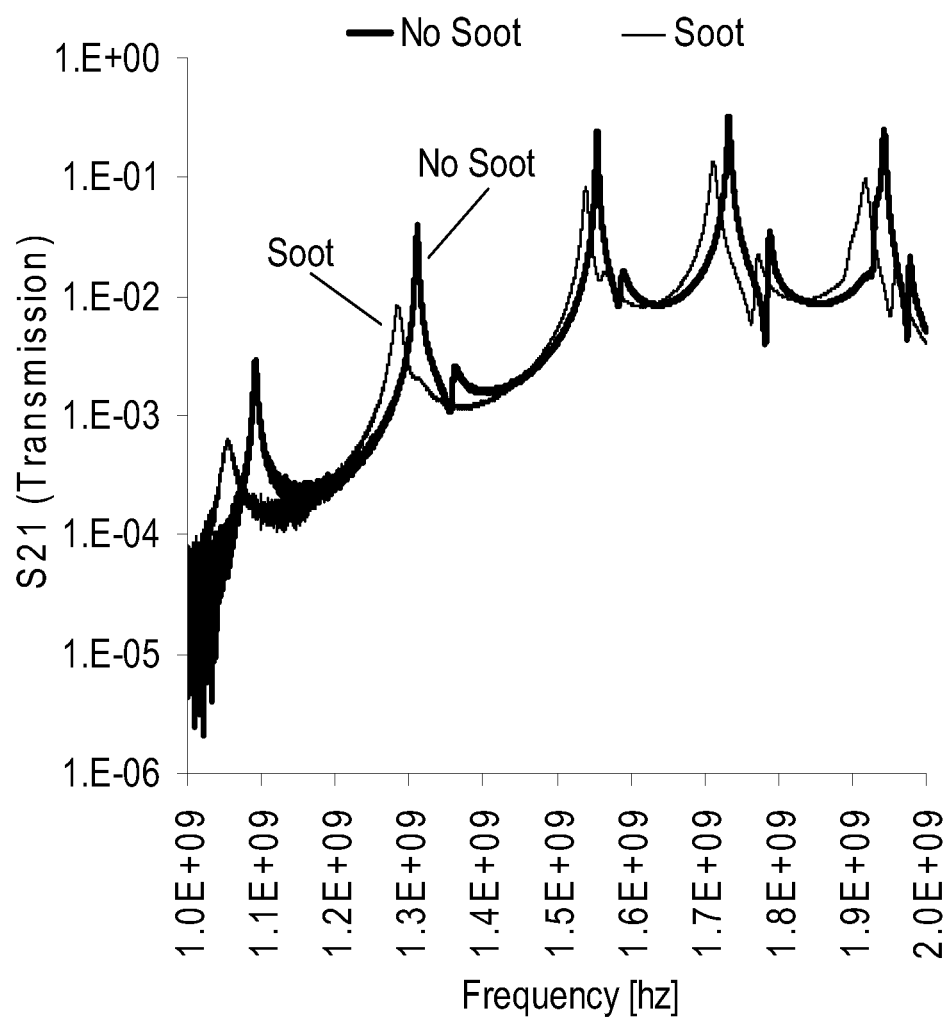
FIG. 11 is a graph of experimentally determined S21 transmission as a function of frequency.
Figure 12:
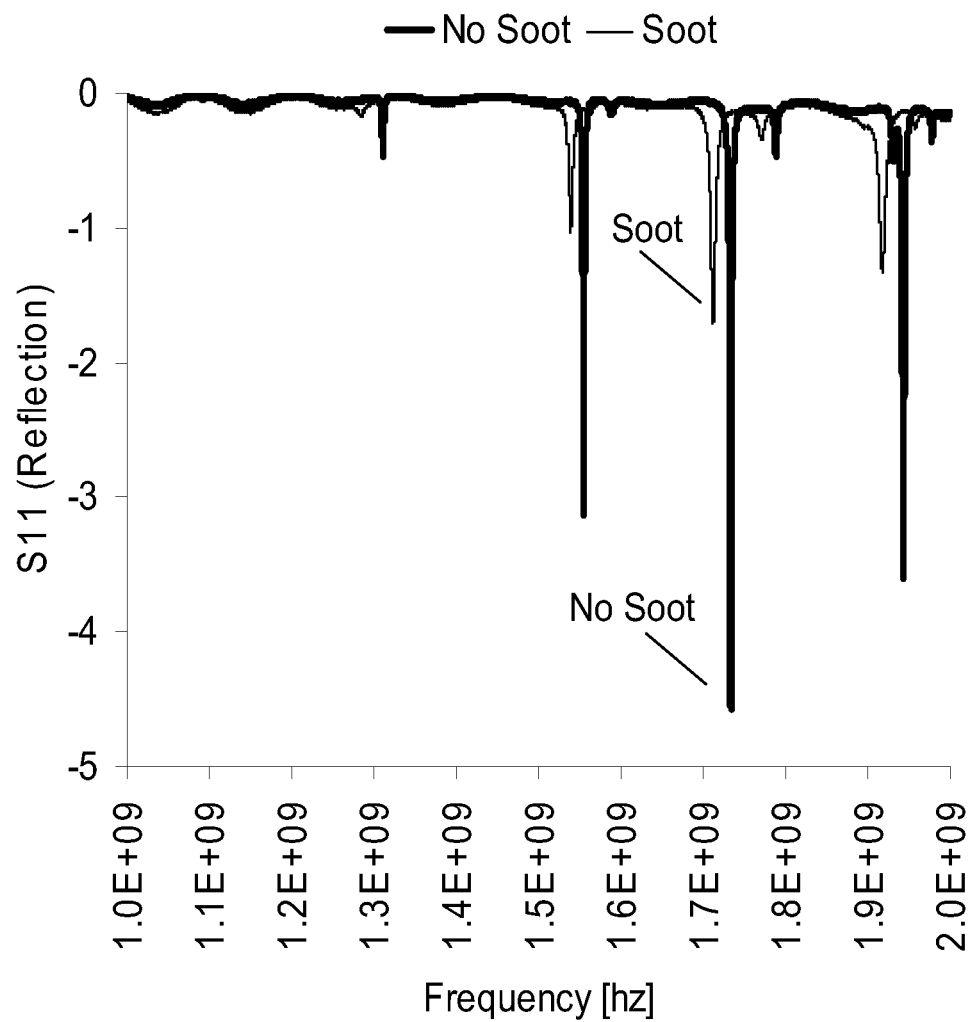
FIG. 12 is a graph of experimentally determined S11 (reflection) response as a function of frequency.

FIG. 11 shows the transmission element S21 as a function of frequency and FIG. 12 shows the reflections from a single launcher/receiver system. In FIG. 11, rod antennas were placed on opposite sides of the trap, as shown in FIG. 1. The graph in FIG. 12 was created with a single antenna and the information is in the reflected signal. Both FIG. 11 and FIG. 12 show multiple resonant modes generated using a voltage controlled oscillator to sweep a frequency range from 1 GHz to 2 GHz and a Schottky diode to detect the transmitted signal in a 5.66 inch diameter cavity containing a cordierite particulate filter. Relative to a clean filter 132, soot accumulation causes a reduction in amplitude of the resonance peaks, a shift in frequency of the resonance peaks, an increase in peak width, and a reduction in quality factor Q. All of these parameters may be used to monitor filter 132 loading, and the changes in signal characteristics are graphically illustrated in FIG. 13.

Specifically, FIG. 11 shows that the presence of soot decreases the resonant frequency at each mode, and also reduces the quality factor, Q. In addition, the amplitude of each peak is also attenuated, as compared to the waveform generated in the absence of soot. Similarly, FIG. 12 shows a dramatic decrease in the amplitude at each resonant frequency, as well as a frequency shift and decrease in Q.

Figure 13:
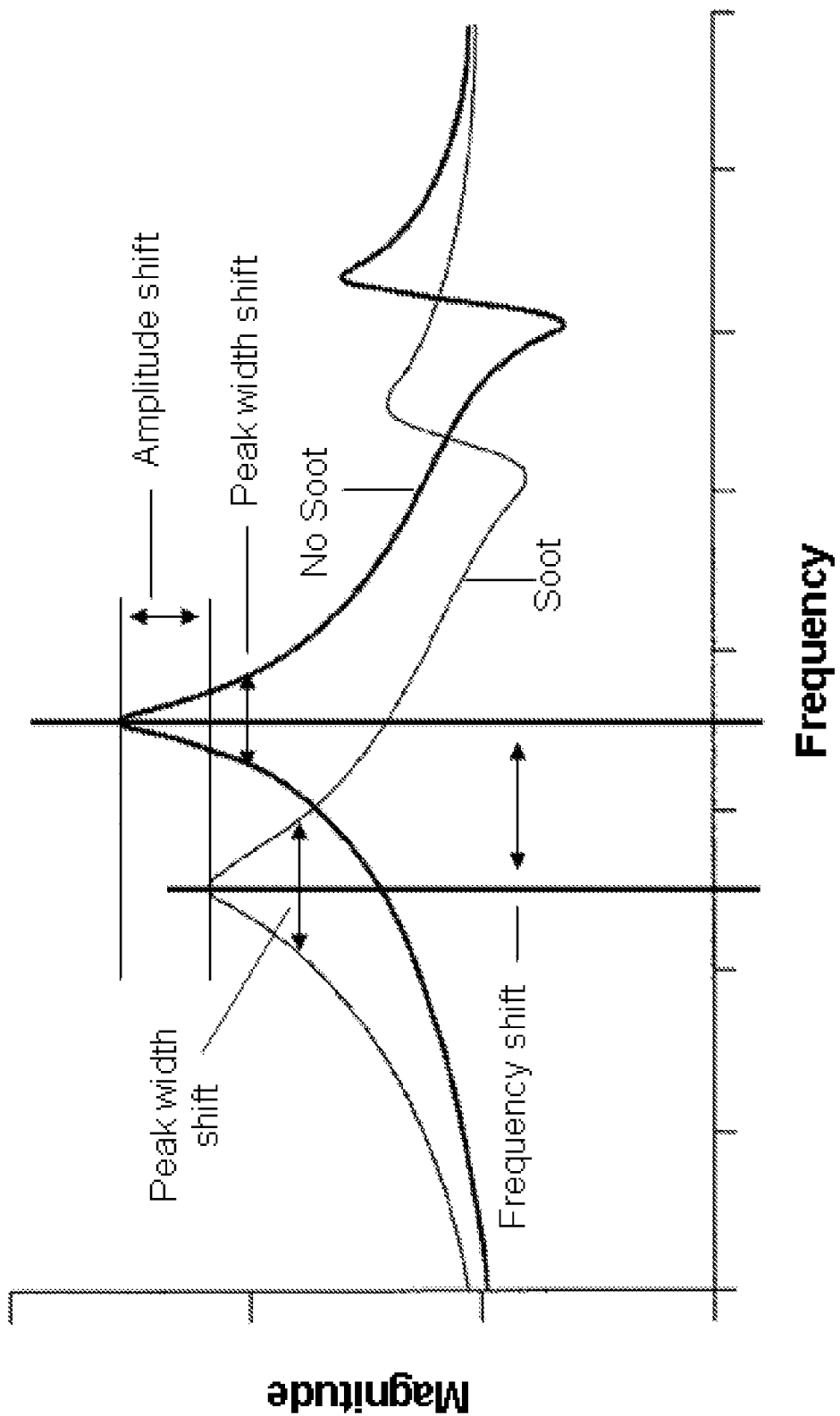
FIG. 13 is a graph showing an expanded view of the transmission mode of FIG. 11.

FIG. 13 is an expanded view of the transmission mode from FIG. 11 and shows detail around the mode near 1.7 GHz. As explained above, the presence of soot changes the characteristics of the received waveform. In this figure, the amplitude is decreased in the presence of soot. Similarly, the peak width is increased, reducing its quality factor, Q. Finally, the frequency of the resonance shifted, due to the presence of soot. It is these differences that allow a determination of trap loading to be determined.

The signal parameters described above: amplitude, frequency, peak width, quality factor, and the like may be computed from the sampled resonance curves using control unit 140. In some cases, these signal parameters may be determined by analog means and in other cases more advanced signal processing, such as by digital means, and the application of various algorithms may be employed. The algorithms may be stored on a computer readable storage medium in or accessible to control unit 140. The resonance curves may be sampled more than once and the signal parameters computed after averaging the resonance curves or multiple cycles, with one cycle being the full frequency range generated by a signal generator. In another example, the signal parameters for the resonance curves may be computed for each cycle. Additional signal statistics such as the mean, median, mode, and standard deviation of the various parameters may also computed and utilized to determine filter 132 loading.

Figure 14:
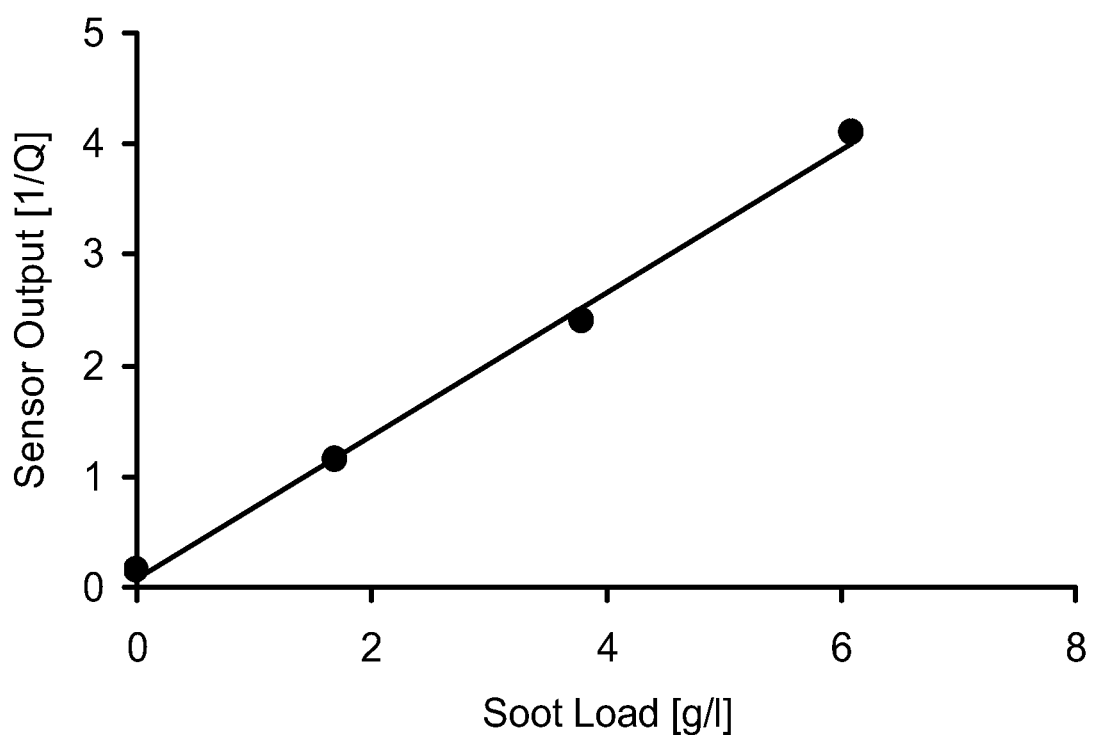
FIG. 14 is a graph showing sensor output as a function of filter soot load.

FIG. 14 shows the sensor output for the microwave sensing system as a function of filter 132 soot load for one cavity 130 resonant mode. In this example, sensor output is the inverse of the signal quality factor. Any of the above mentioned signal parameters may be used to determine filter 132 loading such as amplitude, frequency, peak width, quality factor, and others, with some parameters being more advantageous than others in specific applications. For example, in some cases, signal amplitude may decay in a non-linear fashion with increased filter 132 soot loading while the inverse of signal quality factor may behave linearly, as shown in FIG. 14.

FIG. 14 also depicts a calibration curve which may be uploaded onto a computer readable storage medium accessible by control unit 140. The calibration may be in the form of a look-up table, equation, or other suitable form, for example. Comparison of the measured resonance curves and computed parameters may be compared with the calibration values to determine filter 132 loading. In some cases, only one calibration or threshold value may be required, as it may only be important to determine whether or not the filter 132 loading has exceeded some critical value. In other applications, a more detailed calibration function such as that shown in FIG. 14 may be required.

The various resonant modes depicted in FIG. 11 and FIG. 12 are due to variations in the electric field strength in different regions of the cavity 130. Regions of high electric field strength are affected more strongly by the presence of material accumulation in those regions. This effect may be utilized to monitor the distribution of material accumulated in the filter 132.

Figure 15:
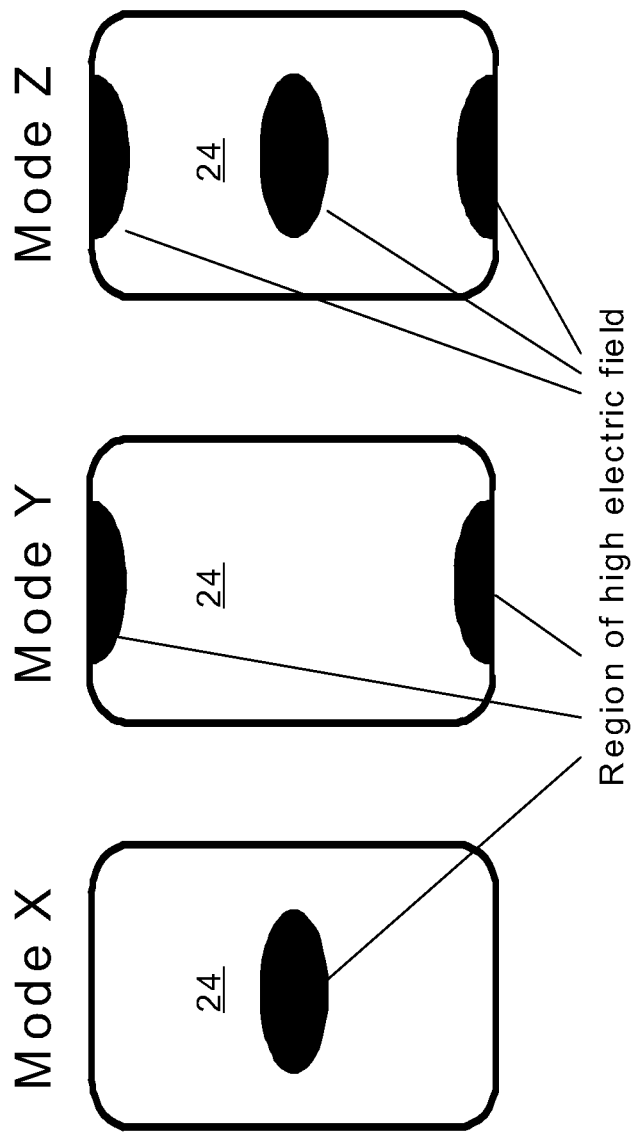
FIG. 15 is an illustration showing how different resonant modes result in different regions of high electric field strength in the filter.

FIG. 15 presents an illustration showing how different resonant modes result in different regions of high electric field strength in filter 132. Only filter 132, and not resonant cavity 130, is shown in FIG. 15. The figure shows mode X resulting in a region of high electric field in the center of filter 132, whereas mode Y results in regions of high electric fields at the inlet and outlet sections of the filter 132. By sampling modes X and Y, the axial distribution of the material loading in filter 132 may be determined. Further increasing the number of modes generated in the filter 132, such as by extending the frequency range of operation, may increase the spatial resolution of the measurement by sampling more regions of the filter 132, as shown by mode Z in FIG. 15. While examples of the axial profile of the modes were shown in FIG. 15, differences in the mode structure and electric field intensities in the radial direction may also exist and can be used to determine the radial distribution of the accumulated material in filter 132.

Figure 16:
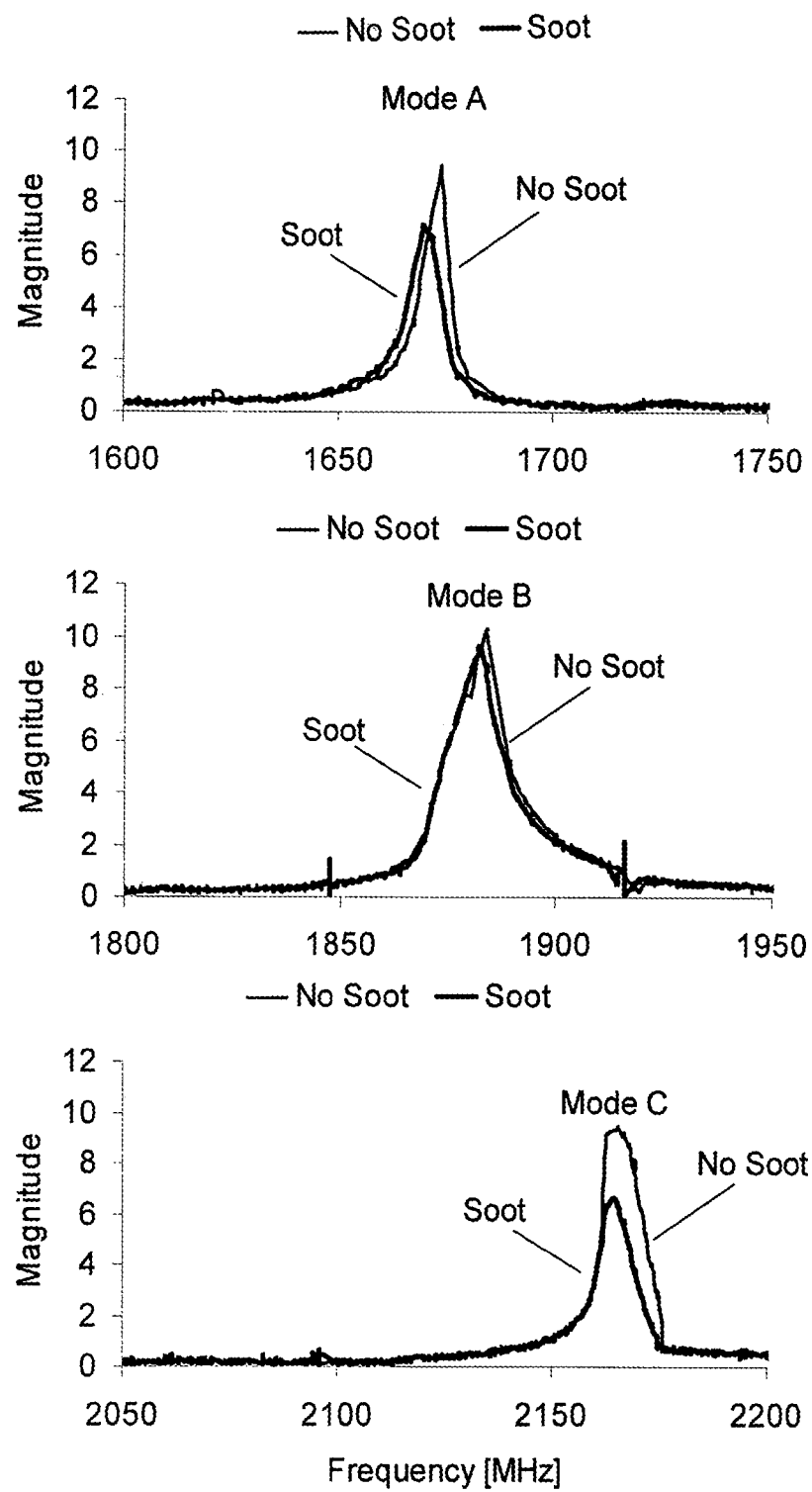
FIG. 16 is a graph showing the response of multiple filter resonant modes to uneven soot distribution.

When the material accumulation in the filter 132 is uniform, all resonant modes may be equally affected. When non-uniformities in the material distribution exist, some modes may be affected more than others. FIG. 16 presents data showing three resonant modes, which are clearly labeled as A, B, and C. The data corresponding to the case without soot is for a clean filter 132. The data corresponding to the case with soot illustrates the effect of non-uniform soot distribution on the resonant mode characteristics. In this case, soot was only deposited near the outer edge of the front face of the filter 132. Clearly modes A and C are affected by the presence of soot in this region of the filter 132, whereas mode B is not.

In one example, multiple resonant modes may be generated in the filter 132 and sampled. A number of signal parameters may be measured or computed from the resonance curve. For each measured signal parameter, $P_{i,m}$, where the subscript "i" corresponds to the mode number, the deviation, $Dev_i$, of the measured signal parameter from the reference signal parameter, $P_{i,r}$, is:

$$Dev_i=(P_{i,m}-P_{i,r})/P_{i,r}.$$

If the deviation, $Dev_i$, of the same signal parameter for each mode, i, is similar, then the filter 132 loading may be uniform. However, if the deviation of the same signal parameter for one mode is significantly different from that of one or more modes the soot loading may be non-uniform.

Application of this example to FIG. 16 for peak amplitude shows $Dev_A$ is −0.24, $Dev_B$ is −0.06, $Dev_C$ is −0.26. The results indicate soot accumulation at front of the filter 132 primarily affects modes A and C, whereas mode B is relatively unaffected. On the other hand, large changes in the signal deviation of mode B relative to modes A and C would indicate little material accumulation at the front of the filter 132. It should be noted however, that the resonant mode structure is a function of the cavity 130 design and geometry. Selection of system operating frequencies to generate the appropriate resonant modes, depends both on cavity 130 geometry as well as the regions of the filter 132 to be sampled. The methods described above can be used to develop the correlations required to related specific resonant modes to material accumulation in different regions of the filter 132.

Figure 17:
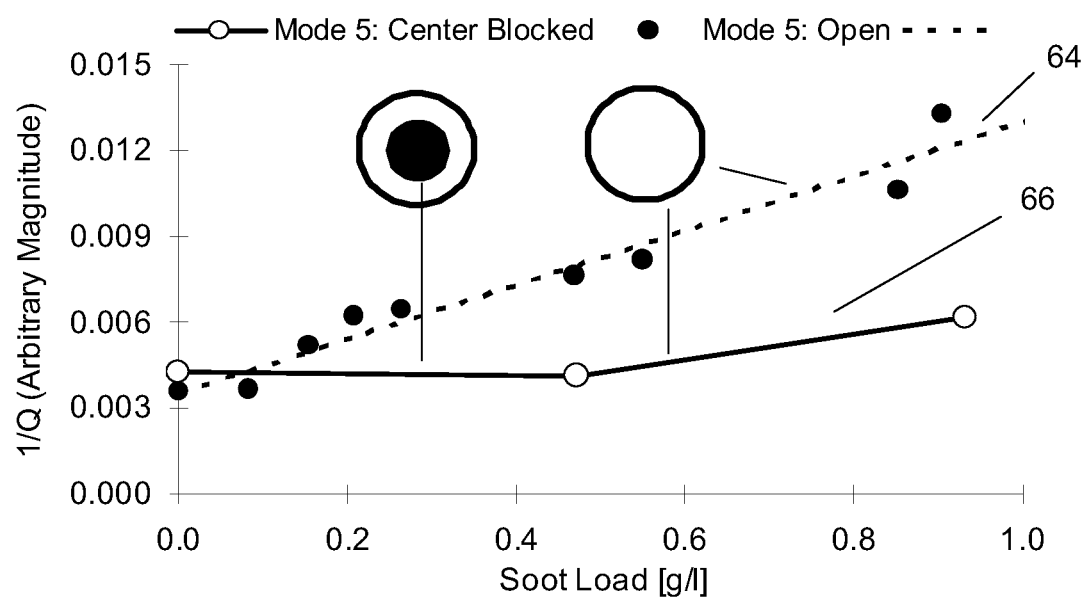
FIG. 17 is a graph showing the sensor output as a function of filter soot load and for different filter soot distributions.

FIG. 17 further illustrates the effect of the distribution of the material accumulated in the filter 132 on the microwave signal response for one filter 132 resonant mode. The graph in FIG. 17 shows the change in the inverse of signal quality factor as a function of filter 132 soot load, for relatively low levels of filter 132 loading. The data corresponding to line 64 resulted from uniform soot accumulation in the filter 132. In line 66, the center of the filter 132 was initially obstructed for the first 0.5 g/L of filter 132 soot loading, thereby preventing soot from depositing in this region of the filter 132.

When no soot was deposited in the center of the filter 132, the resonant mode signal characteristics did not change. Specifically, the data shown in FIG. 17, line 66, shows no change in the inverse of the signal quality factor for filter 132 soot levels from 0 g/L to 0.5 g/L. When the obstruction was removed and soot was deposited in the center of the filter 132, the inverse of the signal quality factor increases with soot loading, also shown by line 66 for soot levels above 0.5 g/L. It should be noted that the signal parameter need not be quality factor as shown in FIG. 17, but can be any suitable parameter such as amplitude, peak width, or frequency of one or more resonant modes, for example. Similarly a signal statistic, such as the mean, median, mode, or standard deviation of one of the signal parameters listed above, may also be used.

In one example, by monitoring the change in one particular mode, such as mode 5, relative to the other resonant modes, the amount of material accumulated in the center of filter 132 may be determined. Similar changes in all of the resonant modes indicate uniform material accumulation within the filter 132, or at least for the regions sampled by the modes used. An increase in the inverse of signal quality factor for mode 5, relative to the other modes, would indicate an increase in the amount of material accumulated in the center of the filter 132. A decrease in the inverse of signal quality factor for mode 5, relative to the other modes, would indicate less material accumulated in the center of the filter 132.

It should be noted however, that any signal parameters or statistics may be used, and that the resonant mode structure is a function of the cavity 130 design and geometry. Selection of system operating frequencies to generate the appropriate resonant modes, depends both on cavity 130 geometry as well as the regions of the filter 132 to be sampled. The inclusion of additional modes, both low and high order, may enhance the spatial resolution of the measurement. Similar correlations relating material loading in various regions of the filter 132 to changes in the characteristics of other resonance modes may be developed.

As illustrated in FIG. 16 and FIG. 17, sampling the resonance curves and comparing the changes in the signal response for multiple resonant modes thus provides information on the spatial distribution of the material accumulated in the filter 132.

In some cases, the location of the material in the filter 132 may not be important, and it may only be important to determine whether or not significant non-uniformities of filter 132 loading exist. In these applications, control unit 140 may be configured to initiate an action when the value of at least one signal parameter corresponding to one resonant mode is outside an allowable range. For example, filter 132 regeneration may be initiated when the local filter 132 soot load exceeds some threshold value, and it may not be important where, in filter 132, the higher soot load exists, only that the loading is sufficiently non-uniform, such as to be outside of an acceptable range.

Figure 18:
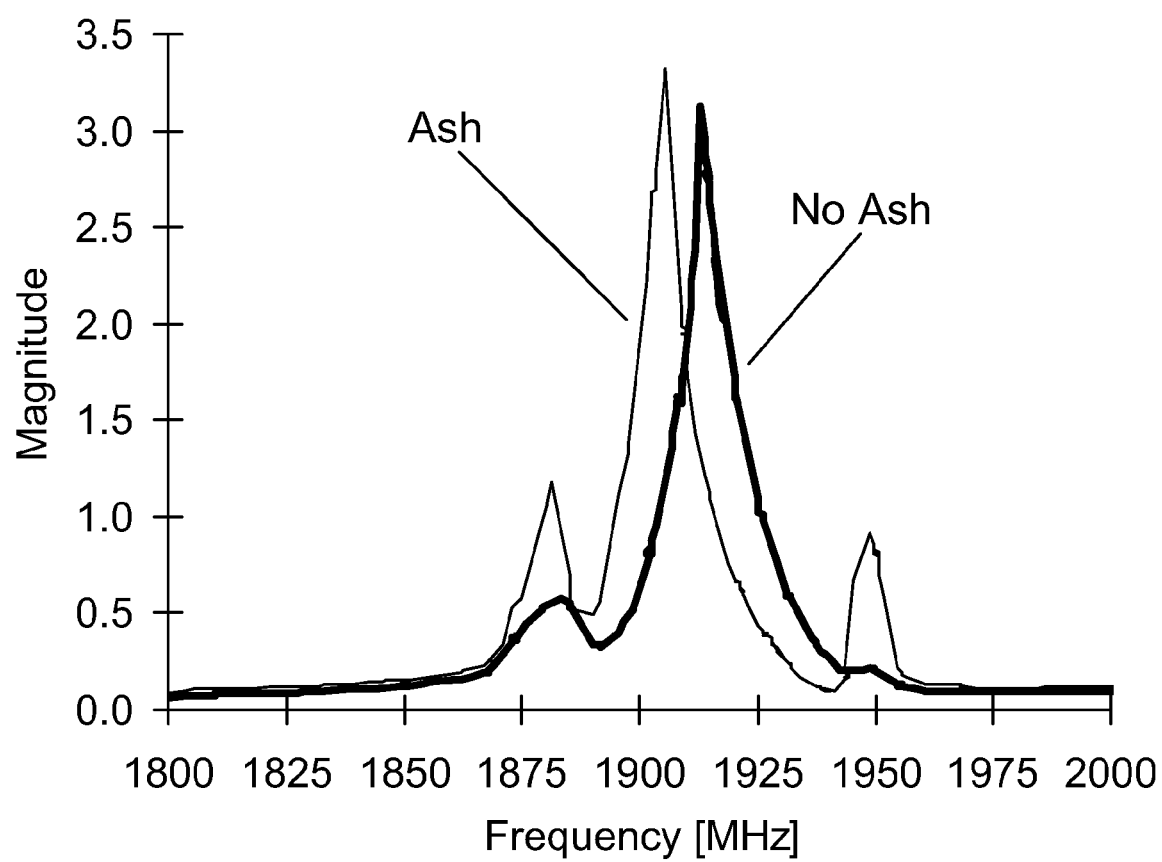
FIG. 18 is a graph showing the response of the microwave signal to ash accumulation in the filter.

The microwave sensing system may also be utilized to determine the type of material accumulated in the filter 132. FIG. 18 illustrates differences in signal characteristics for one filter 132 resonant mode for the cases in which the filter 132 does and does not contain ash. In this example, the presence of the ash strongly affects the degenerate modes, or the small side modes or peaks near the primary resonant modes. As the ash levels in the filter 132 increase, the amplitude, peak width, quality factor, and frequency of these side modes are affected. Monitoring the microwave signal to detect changes in the characteristics of these side modes or peaks provides one means for simultaneously detecting both ash and soot loading.

When conducting particles are deposited in the cavity 130, the dielectric properties of the cavity 130 may change, as there is a partially conducting layer. When this happens, not only does the absorption increase, but the mode properties also vary. This is due to the behavior of the mode under the presence of conducting media on the surface of the filter 132. In general, the modes have different orientation with respect to the surface. Multiple modes at the same frequency exist (degenerate modes), if nothing else because the antennas can generate multiple modes with the same field structure but with different poloidal orientation. A mode with an electric field mainly perpendicular to one of the surfaces (and thus, since the filters usually use square channels), parallel to one of the surfaces, would have different behavior from one where the electric field is at 45 degrees with respect to either surface. Thus, with partially conducting electrical paths, it may be possible to distinguish between the two modes by shifts in frequency. To best use this property, it would be useful to have antennas that can generate multiple modes, (either large antennas), or to have multiple antennas. These antennas could be electrical dipoles (rods), or magnetic dipoles (current loops).

Additionally, ash, which is primarily composed of various metal oxides, sulfates, and phosphates, may also exhibit different dielectric properties from the filter 132 and the soot collected on the filter 132. The dielectric properties of the ash and soot may also vary as a function of temperature and the frequencies used to generate the various resonant modes. In one example the dielectric properties of the ash may result in increased RF signal absorption at elevated temperatures, resulting in a decrease in the amplitude and quality factor (increase in peak width) of one or more resonant modes. In this manner, the ash may be readily detected following high temperature filter 132 regeneration, by comparing the resonant mode characteristics for an ash loaded filter 132 at an elevated temperature to a reference signal for the filter 132 at the same temperature containing no ash. Further, by generating and sampling multiple resonant modes, the distribution of the ash within the filter 132 may be determined.

The control unit 140 may also contain instructions, correction functions, for example, to correct the RF signal based on exhaust temperature, moisture content, and the composition of the particulate matter collected on the particulate filter 132. In some cases, the dielectric properties of the material accumulated in the particulate filter 132 may have a temperature dependence. Temperature sensors 252, 216, 222, and 236, may provide exhaust temperature measurements to control unit 140. The temperature measurements may serve as inputs to correct the RF signal. Signal correction may utilize correction factors, such as values stored in a table, equations, formulas, calibrations, or algorithms, for example.

Water is also a good absorber of RF signals, particularly in the microwave range, and the RF signal may need to be corrected to account for water content in the exhaust gasses, particles, or even in the particulate filter 132 itself. Error introduced through particulate filter 132 water content may be most severe during the first several minutes of engine 118 operation for an engine 118 in a humid climate, for example. Exhaust gas moisture content may be determined from the moisture sensor 220. The amount of water vapor in the exhaust gas may also be estimated using algorithms and models, stored in the control unit 140, and based on such parameters as engine 118 operating conditions, air/fuel ratio, ambient air relative humidity, exhaust temperature, ambient temperature, and other relevant parameters. Knowledge of exhaust water content can be used by the control unit 140 to correct the RF signal, such as through the use of a correction function, or reference values.

The composition of the particulate matter accumulated in the particulate filter 132 may also affect the RF signal. Particulate matter may be composed of carbon, condensed organic material, sulfates, ash, and other components. The composition of the particulate matter may be estimated based on exhaust temperature measurements from temperature sensors 252, 216, 222, and 236, and knowledge of engine 118 operating conditions. Particulate matter composition may also be determined in the control unit 140 from reference values corresponding to different engine 118 operating conditions, such as look up tables, or from algorithms and models designed to predict exhaust particle composition based on engine operation. In another embodiment, changes in signal characteristics may be used to determine particulate matter composition, such as by operating the RF filter load measurement system 288 in reflection (S11, S22) and transmission (S12, S21), thereby including additional elements in the coupling matrix. The instructions, algorithms, and reference values for estimating particle composition may be stored on a computer readable storage medium and accessible by the control unit 140.

The control unit 140 may correct the RF signal based on exhaust gas temperature, moisture content, and particle composition before signal processing (i.e. raw signal from probe 230) or after signal processing (processed signal) and calculation of the signal parameters. In some applications, other corrections may be applied, in addition to those listed above.

Control unit 140 may compare the acquired signal values and statistics with reference or calibration values stored in the control unit 140. The reference or calibration values may be individual values, a collection of values, such as in a table or look up table, or calibration functions, such as an equation. The reference values may be stored on a computer readable storage medium in the control unit 140 or in a location accessible by the control unit 140. The control unit 140 may also contain algorithms or computer programs, also stored on a computer readable storage medium. These algorithms or programs may utilize inputs from a variety of sensors shown in FIG. 2. The algorithms or programs may be used to estimate the amount of material loading in the particulate filter 132 and also provide reference values for comparison with the RF signal and signal values computed in the control unit 140.

Comparison of the RF signal parameters with the reference values allows determination of the amount, type, and location of material collected in the particulate filter 132. In the case of soot loading, the control unit 140 may initiate an action, such as filter 132 regeneration, once the measured soot load exceeds some allowable value. The control unit 140 may also trigger an alarm 270, such as a lamp on the display 268 to alert the operator. The regeneration may be triggered based on the total average filter 132 soot load, or the local soot load in a specific region of the filter 132.

Each resonant mode corresponds to regions of high electric field in the cavity 130 containing filter 132, and the signal is most sensitive to material accumulation in regions of the filter 132 with high electric field strength. By comparing the signal response of multiple resonant modes, differences in material distribution in the filter 132, and thus the local material loading may be determined. For example, uniform material distribution may affect all signals equally, whereas non-uniform distribution may affect some modes more than others.

In one embodiment, the control unit 140 may trigger filter 132 regeneration based on the filter 132 soot level determined from the RF filter sensing system 288. In another embodiment, regeneration is triggered based on inputs from various sensors. In one embodiment, an exhaust gas soot sensor 218 may provide measurements of exhaust gas soot levels entering the particulate filter 132. Knowledge of the flow rate of soot into the filter 132 may be utilized by the control unit 140 to estimate the amount of soot accumulated in filter 132 over a given period of time. Measurements of exhaust gas temperature provided by temperature sensors 216 and 236 or filter 132 internal temperature measurements from temperature sensor 222 may also be used to estimate soot oxidation rates in the DPF and more accurately predict the amount of soot accumulated in the filter 132. The control unit 140 may trigger filter 132 regeneration based on filter 132 soot levels determined from soot sensor 218.

In one embodiment, soot sensor 218 may be used to determine filter 132 soot levels in a filter housing 130 that is not designed to function as an RF resonant cavity. In this case, the RF filter measurement system 288 may not be employed. In other embodiments, a combination of RF filter measurement system 288 and various sensors is used to trigger regeneration.

In one embodiment, the control unit 140 may utilize inputs from exhaust pressure sensors 212 and/or 238 to trigger filter 132 regeneration. If exhaust backpressure measured by pressure sensor 212 exceeds a critical value the control unit 140 may trigger an alarm 270 to alert the operator. The alarm 270 may be visual or audible. The control unit 140 may trigger regeneration if the backpressure measured by pressure sensor 212 or pressure drop measured by pressure sensors 212 and 238 exceed a threshold level. Pressure measurements may also be used to estimate the state of filter 132 loading.

In one embodiment, the control unit 140 may trigger filter 132 regeneration based on the elapsed time since the previous regeneration. The elapsed time may be determined using the timing device 266. The control unit 140 may also contain instructions, algorithms, or computer programs on a computer readable storage medium. These programs may be used to estimate (such as in a predictive manner) the amount of particulate matter accumulated in the particulate filter 132 and also to trigger regeneration once the estimated filter 132 loading exceeds some threshold value. In one embodiment, the control unit 140 may utilize inputs from an engine speed sensor 278, a ground speed sensor 272, timing device 266, and other measured and computed parameters such as engine air/fuel ratio to predict engine-out particle emissions and filter 132 loading. Output from these programs may also be used by the control unit 140 to trigger filter 132 regeneration.

The control unit 140 may use one or more measures of filter 132 soot loading from the RF filter measurement system 288, the exhaust gas soot sensor 218, the exhaust pressure sensors 212 and 238, the timing device 266, or the output from algorithms and predictive models (virtual sensors) to trigger filter 132 regeneration. Redundant measures may be useful to verify and diagnose filter 132 or system 120 failures or malfunctions. In the same manner, information from one or more than one of these sensors may be used by the control unit 140 to control the regeneration process, such as soot oxidation rate, for example. In one embodiment, input from temperature sensors 216, 222, or 236 may be used by the control unit 140 to limit or slow down the regeneration process, if any of these temperatures approach a critical value in order to protect the particulate filter 132 from temperature related failures such as cracking, melting, or even ash sintering. In the event that filter 132 internal temperatures or exhaust temperatures exceed some critical value, the control unit 140 may also trigger an alarm 270 to alert the operator. In another example, if exhaust temperatures are too low, the control unit 140 may speed up the regeneration process such as by increasing exhaust temperature, for example.

In yet another example, measurements of particulate filter 132 soot content from the RF filter sensing system 288 over a period of time, as measured by the timing device 266, may be used by the control unit 140 to compute soot oxidation rates. If the soot oxidation rate is too slow or too fast, the control unit 140 may modify the regeneration process to speed up or slow down filter 132 regeneration. Similarly measurements from the exhaust pressure sensors 212 and 238 may also be used by the control unit 140 as indication of soot oxidation rate.

Most commercial filter measurement systems use pressure drop measurements and predictive models. The predictive models take information from engine 118 operating conditions to estimate soot emissions and the amount of soot accumulated in the particulate filter 132. In the industry, these predictive models are referred to as virtual sensors. In the present system, the control unit 140 may use one or more measures of filter 132 soot loading from the RF filter measurement system 288, the exhaust gas soot sensor 218, the exhaust pressure sensors 212 and 238, the timing device 266 or the output from algorithms and predictive model (virtual sensors) to end filter 132 regeneration. The control unit 140 may end filter 132 regeneration after the filter 132 soot load as measured by the RF filter measurement system 288 is reduced below some acceptable value. Similarly, the control unit 140 may also end the regeneration event after exhaust pressure as measured by pressure sensors 212 and 238 are reduced to an acceptable value, or after a specified amount of time has elapsed as measured by the timing device 266. The control unit 140 may also end regeneration if exhaust conditions are no longer favorable for filter 132 regeneration, or the engine 118 is turned off, for example.

The control unit 140 may initiate, control, and end filter 132 regeneration by modifying exhaust temperature via a number of means. In one embodiment, the control unit 140 may increase the hydrocarbon or fuel content in the exhaust by injecting fuel directly into the exhaust stream using injector 250 or injecting fuel in the engine 118 cylinders late in the combustion event using injectors 256, 258, and 260. In one embodiment, the regeneration device 126 may be a burner used to combust the fuel. In another embodiment, the regeneration device 126 may be an oxidation catalyst 126. The control unit 140 may control fuel injection in the exhaust as one means of controlling exhaust temperatures via the regeneration device 126. Information from temperature sensors 252, 216, 222, or 236 may be used by the control unit 140 to ensure the regeneration device 126 is functioning correctly and to regulate exhaust fuel flow to control exhaust temperatures.

In another embodiment, the control unit 140 may control engine 118 operating parameters in such a way as to modify exhaust temperatures. For example, control unit 140 may restrict engine airflow by means of a throttle 282, or by controlling compressor 284 operation, or by modifying exhaust gas recirculation rates (not shown). The compressor 284 may be a turbocharger, supercharger, or any other suitable device for increasing airflow to the engine 118. The control unit 140 may also alter fuel injection via injectors 256, 258, and 260 as another means of modifying engine operation to modify exhaust temperatures. In another embodiment, the engine 118 may be operated at elevated load conditions to regenerate the particulate filter 132.

In addition to modifying engine 118 operating parameters to change exhaust temperatures, control unit 140 may also modify engine 118 operation to alter exhaust gas composition. In one embodiment, control unit 140 may adjust engine 118 operation to increase engine-out NOx levels to promote filter 132 regeneration via $NO_2$, for example.

In one embodiment, the particulate filter control system 120 may also monitor ash levels in the filter 132. Similar to the means for soot detection, the RF filter sensing system 288 may measure the amount of ash accumulated in the particulate filter 132 and the distribution of the accumulated ash. The control unit 140 may trigger an alarm 270, such as by modifying the display 268, or an audible or visual alarm 270 to alert the operator when ash levels exceed some threshold value and the filter 132 requires ash cleaning or replacement. The control unit 140 may trigger the alarm 270 when the total average ash levels in the filter 132 exceed some critical value, or when the local ash levels in some region of the filter 132 exceed some critical value.

The control unit 140 may also use measurements of filter 132 pressure drop or backpressure from sensors 212 and 238 after a complete regeneration event to estimate ash levels in the filter 132. In one embodiment, information from the RF filter sensing system 288 may also be used by the control unit 140 to confirm the absence of any appreciable amount of soot in the filter 132 or to correct the pressure measurement for the filter 132 soot levels, thereby increasing the accuracy of the pressure-based ash level estimates. In one example, the control unit 140 may trigger an alarm 270 if the exhaust pressure measurements exceed some threshold value following complete filter 132 regeneration. The control unit 140 may also trigger an alarm 270 or modify the display 268 to alert the operator to service the filter 132 if the time between service intervals as measured by the timing device 266 exceeds some duration.

The particulate filter control system 120 may also perform diagnostic functions to detect various failures or malfunctions of the after-treatment system 124 or engine 118 and any of its associated components, such as sensors for example. In one embodiment, the control unit 140 may detect filter 132 failures or malfunctions such as cracking or melting, which would permit particles to escape from the filter 132.

The control unit 140 may utilize the RF filter sensing system 288 to detect such filter 132 failure modes. For example, the anomalous build up of soot or ash in certain regions of the filter 132 or lack thereof, may indicate the presence of a crack allowing particles to escape from the filter 132 in certain regions. Low soot or ash levels measured in one region of the filter 132 relative to other regions may be an indication of a filter 132 failure. A sudden change in the RF filter sensing system 288 output, such as an anomalous shift in the resonant mode frequencies, quality factor, peak width, or signal attenuation, or any of the associated statistics may also indicate a filter 132 failure.

Measurements of exhaust gas particle content downstream of the particulate filter 132 may be measured by exhaust gas soot sensor 234 and used by the control unit 140 to detect filter 132 failures causing particles to escape from the filter 132. Low exhaust back pressure or pressure drop measurements from sensors 212 or 238 may also indicate a filter 132 failure, for example.

The control unit 140 may also control an RF signal generator 240, probes 242 and 246 and an RF signal detector 244 connected to the catalyst assembly 134, comprising an RF catalyst monitoring system 290. The catalyst assembly 134 may include a housing 136 and catalyst 138. Catalyst housing 136 may be designed to function as a resonant cavity similar to the particulate filter housing 130. RF sensing may be employed to monitor material accumulation in the catalyst assembly 134 by sweeping a frequency range suitable to generate one or more resonant modes and analyzing the mode structures.

In this manner, catalyst 138 face plugging, such as by improper urea injection may be detected. Physical catalyst 138 failures, such as by cracking or melting of the catalyst substrate 138, may also be detected using the RF catalyst monitoring system 290 in the same manner. The control unit 140 may also use measurements from NOx sensor 248 and ammonia sensor 262 to determine if the catalyst 138 has malfunctioned or to adjust engine 188 or catalyst 138 operation. In another embodiment, the RF catalyst monitoring system 290 may be used to detect the presence of particulate matter on catalyst 138 as a means for determining whether or not particulate filter 132 has failed. The catalyst assembly 134 may be any type of catalyst suitable for reducing exhaust gas emissions.

In another embodiment, the control unit 140 may perform a series of diagnostic functions to detect malfunctions in any of the sensors required for proper operation of the after-treatment system 124. For example, the control unit 140 may use redundant measurements to compare the output from two or more sensors. Measurements from temperature sensors 252, 216, 222, and 236, may be compared by the control unit 140 at a given condition. Significant deviation of any one temperature measurement may indicate a problem with that specific temperature sensor. Similar methods can be applied to verify correct operation of pressure sensors 212 and 238, and NOx sensors 254 and 248, for example.

In another embodiment, the control unit 140 may utilize two or more different measurement methods to measure the same parameter. For example, the pressure sensors 212 and 238, soot sensor 218, RF filter load measurement system 288 may each be used to independently measure filter 132 soot load. Deviation of soot load measurements by any one of these methods from the others, by a certain factor, may indicate sensor malfunction.

The control system 140 may also compare output for any of the sensors shown in FIG. 2 to a known value at a particular reference condition as another means for detecting sensor malfunction.

In the event a filter 132 failure or sensor malfunction is detected, the control unit 140 may trigger an alarm 270, such as lamp or buzzer on display 268. Control unit 140 may also modify or limit engine 118 operation to reduce or prevent excessive emissions or damage to the engine 118 or after-treatment system 124.

Measurements of exhaust conditions and emissions values may also be used by the control system 140 to control engine 118 and after-treatment system 124 operation. For example, the control unit 140 may utilize exhaust soot emissions measurements from the exhaust gas soot sensor 218 to modify engine 118 operation to either increase or decrease exhaust soot levels, such as by controlling engine 118 air/fuel ratio, injection strategy, or exhaust gas recirculation rates. Similarly, the control unit 140 can compute exhaust soot emissions from measurements of soot accumulation in the particulate filter 132 from the RF filter load measurement system 288 and information provided by the timing device 266, for example.

In one embodiment, the control unit 140 may utilize exhaust soot measurements for feedback or closed loop control of engine 118 combustion. Similarly, the control unit 140 may utilize NOx sensor 254 or 248 measurements to modify engine operation to achieve a desired level of NOx emissions, or for closed loop combustion control based on NOx emissions levels. In another example, the control unit 140 may utilize oxygen sensor 214 measurements to modify engine operation to achieve a desired level of exhaust oxygen emissions. The ability to measure both exhaust soot emissions using either exhaust gas soot sensor 218 or the RF filter load measurement system 288 and exhaust NOx levels using NOx sensors 254 or 248 allows for optimization of the well-known particulate-NOx trade-off through improved combustion control. The control unit 140 may also infer or compute exhaust emission levels, such as particulate matter or other gaseous emissions components for example, from oxygen sensor 214 measurements and knowledge of engine 118 air/fuel ratio.

Modifying engine 118 combustion to alter exhaust emissions levels is useful to improve the operation of the after-treatment system 124. In one example, the control unit 140 may modify engine 118 operation to increase NOx emissions during particulate filter 132 regeneration to promote soot oxidation via $NO_2$. In another example, the control unit 140 may modify engine 118 operation to reduce NOx emissions during regeneration of the NOx reduction catalyst 134. NOx emissions may be modified by altering EGR rates, injection strategy, such as injection timing, or other well-known methods. Control unit 140 may or may not use measurements from NOx sensors 254 or 248 to adjust exhaust gas NOx levels.

Figure 3:
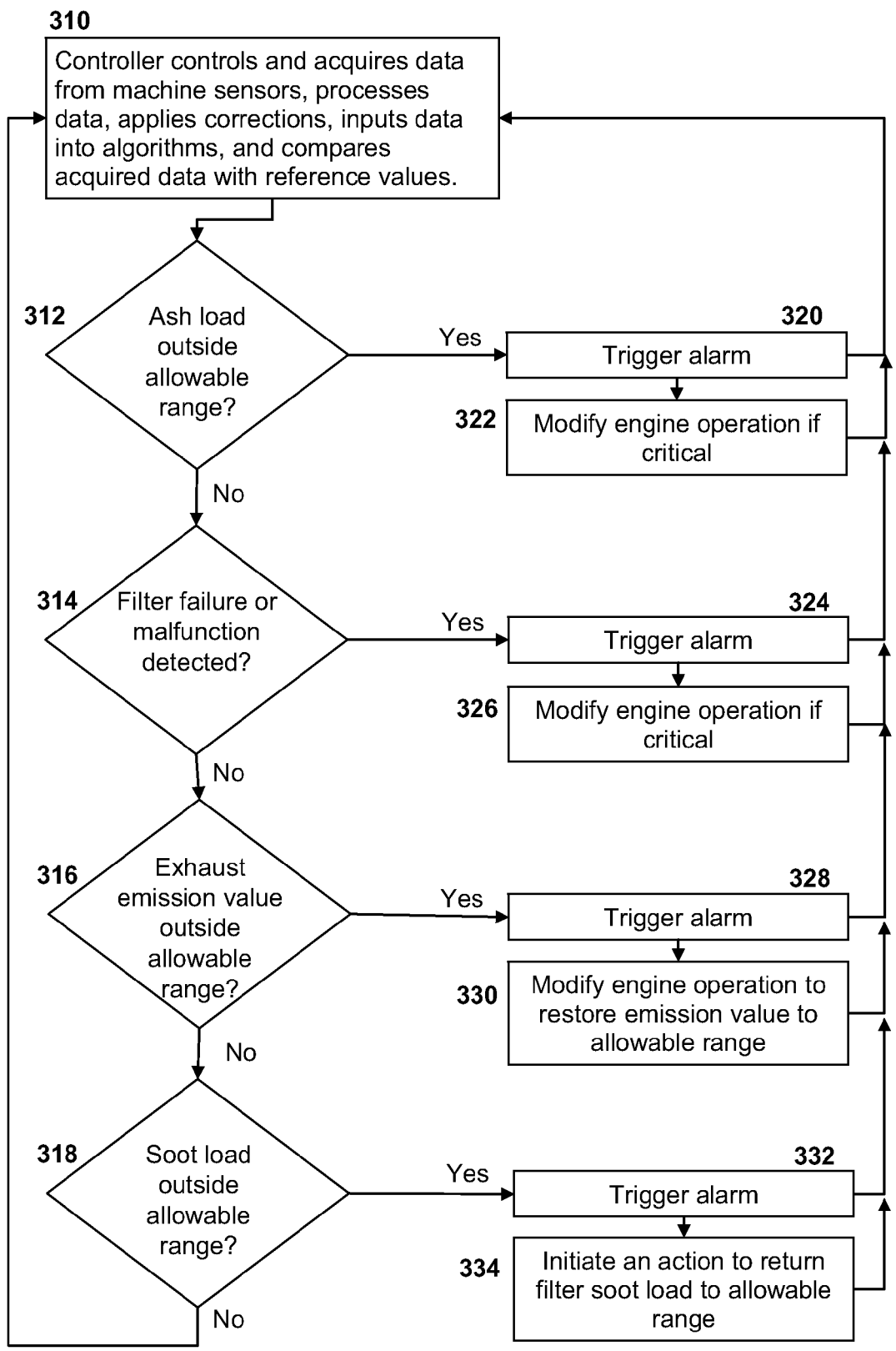
FIG. 3 is a flowchart illustrating the general methodology to control engine and particulate filter operation according to an exemplary embodiment.

The general methods and steps executed by the particulate filter control system 120 are illustrated in the flowchart shown in FIG. 3. In one embodiment, the control unit 140 acquires data from a number of sensors installed on the engine 118, after-treatment system 124 and machine 110 (Step 310). The control unit 140 may also process the data, apply various corrections to the data, execute a series of instructions, and compare the acquired data and computed parameters with reference or calibration values (Step 310), such as through the use of a rules-based system in some embodiments, or alternatively an expert system may be employed.

Following data acquisition, processing, and comparison, the control unit 140 may determine whether or not filter 132 ash loading is outside an allowable range (Step 312), using a method described above. If filter 132 ash load is outside the allowable range, control unit 140 may trigger an alarm 270 (Step 320) and, in some embodiments, the control unit 140 may also modify engine 118 operation if ash levels exceed some critical value (Step 322) to prevent damage to the engine 118 or after-treatment system 124.

If filter 132 ash load is within acceptable limits, the control unit 140 may determine if a filter 132 failure of malfunction has occurred (Step 314). If a failure or malfunction has occurred, control unit 140 may trigger an alarm 270 (Step 324) and, in some embodiments, may modify engine 118 operation if a critical malfunction has occurred (Step 326) to prevent damage to the engine 118, after-treatment system 124, or excessive emissions.

If a filter 132 malfunction or failure is not detected, the control unit 140 may determine if an exhaust emissions value is outside an allowable range (Step 316). If an exhaust emissions value is outside an allowable range, control unit 140 may trigger an alarm 270 (Step 328) and, in some embodiments, may modify engine 118 operation to restore the emissions value to an acceptable level (Step 330). In other embodiments, the control unit 140 may carry out a diagnostic function to determine why the emissions value is outside an acceptable range, or limit engine 118 operation.

If the emissions values are all within acceptable limits, the control unit 140 may determine if filter 132 soot levels are outside an allowable range (Step 318). If filter 132 soot levels are outside an allowable range, control unit 140 may trigger an alarm 270 (Step 332) and modify engine 118 operation or initiate and action to return filter 132 soot levels to an acceptable level (Step 334), such as filter 132 regeneration. The alarm 270 may be a lamp, in one example, and may or may not be triggered to alert the operator that filter 132 regeneration is occurring. In some embodiments, regeneration can happen automatically and is not an error condition. In other embodiment, an alarm 270 may be activated during regeneration to alert the driver that regeneration is occurring, particularly so they do not turn the engine 118 off in the middle of the regeneration.

In some embodiments, all of the sensors required to implement the flow chart of FIG. 3 may not be used. In such an embodiment, the flowchart shown would simply eliminate those steps. For example, the absence of a exhaust sensor would eliminate the possibility of testing the exhaust emission value in step 316. In this case, the controller 140 moves directly from step 314 to step 318.

Figure 4:
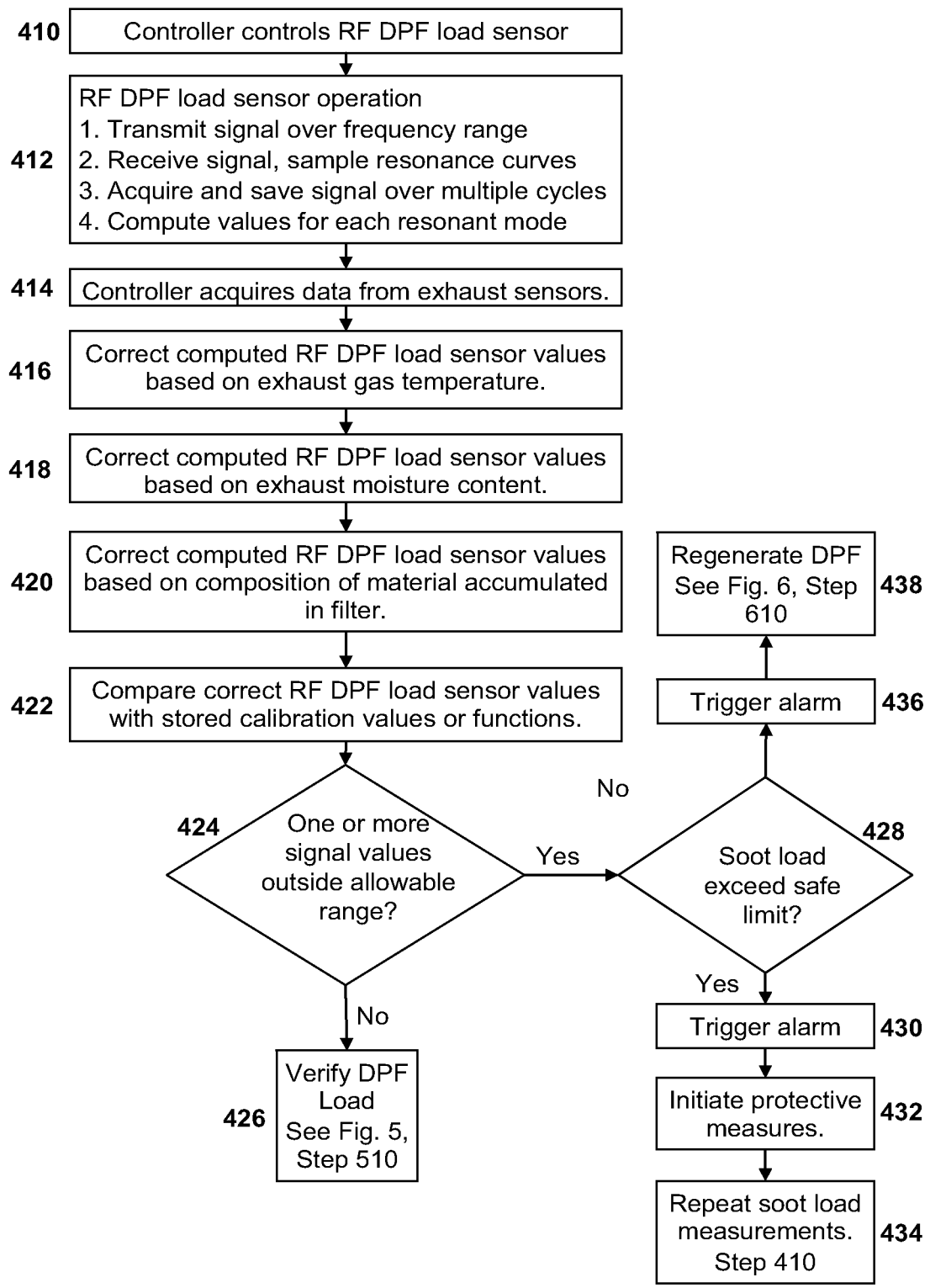
FIG. 4 is a flowchart illustrating the methodology to determine filter soot loading and initiate an action using a radio frequency-based sensor according to an exemplary embodiment.
Figure 5:
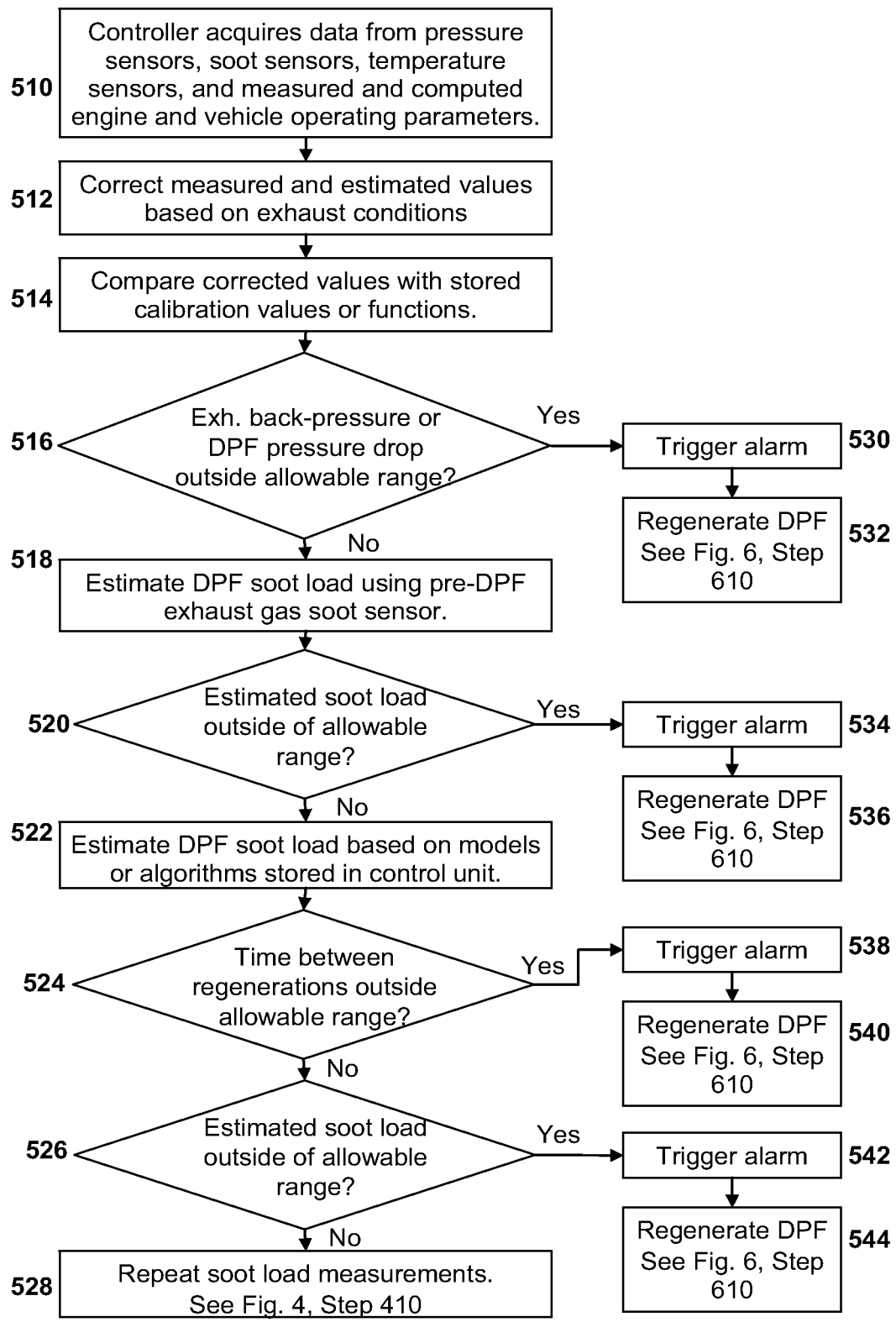
FIG. 5 is a flowchart illustrating the methodology to determine filter soot loading and initiate an action using exhaust gas sensors according to an exemplary embodiment.

One method of implementing the particulate filter control system 120 to measure filter 132 soot loading is illustrated in the flowcharts shown in FIG. 4 and FIG. 5. It should be noted that although the flowcharts refer to the filter 132 as a "DPF" any filter 132 may be used. FIG. 4 shows a flowchart for embodiments in which the RF filter measurement system 288 is utilized. Controller 140 may control the RF filter measurement system 288 (Step 410) by transmitting an RF signal through filter 132 over a frequency range sufficient to generate at least one resonant mode in cavity 130, receiving the transmitted signal and sampling the resonance curves, acquiring and saving the signal over one or more sweeps of the frequency range (cycles), and computing parameters and statistics for each resonant mode (Step 412). The signal parameters and statistics may include the frequency, peak width, amplitude, and quality factor of one or more resonant modes. Signal statistics may include the mean, median, standard deviation, and mode of each of the computed parameters as determined over one or more consecutive measurements. The resonance curves may also be averaged.

Controller 140 may then acquire data from additional sensors depicted in FIG. 2 (Step 414). Controller 140 may correct the RF filter load sensor 288 values based on exhaust gas temperature measurements (Step 416), correct the RF filter load sensor 288 values based on exhaust moisture content (Step 418), and correct the RF filter load sensor 288 values based on the composition of the material accumulated in the filter 132 (Step 420). In other embodiments, correction is made based on less than all of these sensor values. Other corrections not listed may also be required.

Following correction of the RF filter load sensor data 288, control unit 140 may compare the corrected values with stored calibration values, functions, or the results of predictive models (Step 422). If one or more signal parameters are outside an allowable range (Step 424), the control unit 140 will determine whether or not the filter 132 soot load level has exceeded a critical or safe limit (Step 428).

In one example, the signal parameters may include the quality factor, Q, resonant frequency, width, and amplitude of multiple resonant modes. The control unit 140 may contain functions, such as equations, relating each of these parameters to soot load. The parameters listed above may be input into each of their respective functions to determine filter 132 soot load based on the measured resonant frequency, Q, or peak width or amplitude. If the filter 132 soot load as determined by one or more of these parameters exceeds the threshold value by more than a predetermined amount, such as 5%, for example, the filter 132 soot load may be determined to have exceeded the critical or safe level.

If the filter 132 soot load has exceeded a critical level, the control unit 140 may trigger an alarm 270 (Step 430), and initiate protective measures (Step 432) to prevent damage to the engine 118 or after-treatment system 124. The control unit 140 will then repeat the soot load measurements (Step 434).

If the soot load in the filter 132 is outside the allowable range (Step 424) but has not exceeded a critical limit (Step 428), the control unit 140 may or may not trigger an alarm 270 (Step 436) before initiating filter 132 regeneration (Step 438). If the RF filter measurement system 288 signals or computed signal parameters are not outside the allowable range (Step 424), the control unit 140 will proceed to verify the state of filter 132 loading (Step 426) using a second method. In some embodiments, the load cannot be measured in a different manner. In this case, the controller returns to step 410.

FIG. 5 shows the flow diagram of the control system, when using various sensors to determine filter 132 loading. These steps can be executed in conjunction with those in FIG. 4, if the system has both a RF system 288 and sensors. In this embodiment, the two methods are used to verify the results and to improve the accuracy of the results. In the embodiment where an RF system 288 is not used, this diagram shows the steps used by the controller 140 to determine soot loading.

The controller 140 may acquire data from pressure sensors 212 and 238, temperature sensors 252, 216, 222, and 236, soot sensor 218, and other measured and computed engine 118 and machine 110 operating parameters (Step 510). The control unit 140 may correct the sensor measurements based on exhaust conditions (Step 512) and compare the measurements with reference or calibration values or functions (Step 514). This diagram assumes the presence of pressure sensors, temperature sensors and soot sensors. If any of these sensors are not used in a particular embodiment, the decision box associated with that sensor is skipped. For example, if a pressure sensor is not included, the flowchart would go from step 514 to step 518.

If the exhaust back-pressure or filter 132 pressure drop is outside an allowable range or exceeds some threshold value (Step 516), the control unit 140 may trigger an alarm 270 (Step 530) and initiate filter 132 regeneration (Step 532). If the exhaust back-pressure or filter 132 pressure drop is not outside an allowable range or does not exceed some threshold value (Step 516), the control unit 140 may estimate filter 132 soot levels using measurements from soot sensor 218 (Step 518). The control unit 140 may or may not utilize inputs from timing device 266, exhaust temperature sensors 252, 216, 222, and 236, and knowledge of exhaust flow rate to determine filter 132 soot loading based on soot sensor 218 measurements. The control unit 140 may estimate exhaust flow rate from intake air flow measurements and commanded fuel flow or fuel/air ratio for example, among other parameters.

If the estimated filter 132 soot load based on the soot sensor 218 measurements is outside an allowable range or exceeds some threshold value (Step 520), the control unit 140 may trigger an alarm 270 (Step 534) and initiate filter 132 regeneration (Step 536). In one example, the soot sensor 218 measurements provide the instantaneous exhaust soot concentration upstream of the filter 132. The control unit 140 may use the soot sensor 218 measurements along with knowledge of the exhaust gas flow rates, to compute the amount of soot flowing into filter 132. The control unit 140 may further use measurements from timing device 266 to determine the amount of soot accumulated in filter 132 over a specific time interval. Control unit 140 may also utilize measurements of exhaust temperature to estimate soot oxidation in filter 132 to improve the accuracy of the filter 132 soot load measurements using soot sensor 218.

If the filter 132 soot load is not outside an allowable range or does not exceed some threshold value (Step 520), the control unit 140 may estimate filter 132 soot levels using models or algorithms stored on a computer readable storage medium in or accessible by the control unit 140 (Step 522). In one example, these algorithms may be as simple as comparing the elapsed time since the last filter 132 regeneration with the some threshold value being the maximum allowable time between filter 132 regenerations. In another example, the algorithms may be more sophisticated such as predictive models, also known as virtual sensors. These models may utilize measurements or knowledge of engine air and fuel flow, engine speed, exhaust temperature, and elapsed time since the last filter 132 regeneration, in addition to other parameters, to predict the amount of soot emitted by the engine 118 and collected on filter 132 over a period of time.

If the time between filter 132 regenerations as measured by the timing device 266 exceeds some threshold value or is outside of an allowable range (Step 524), the control unit 140 may trigger an alarm 270 (Step 538) and initiate filter 132 regeneration (Step 540). If the time between filter 132 regenerations as measured by the timing device 266 does not exceed some threshold value or is not outside of an allowable range (Step 524), the control unit 140 may determine if the estimated filter 132 soot load as determined by the algorithms or predictive models is outside an allowable range (Step 526).

If the estimated filter 132 soot load based on the predictive models and algorithms is outside an allowable range or exceeds some threshold value (Step 526), the control unit 140 may trigger an alarm 270 (Step 542) and initiate filter 132 regeneration (Step 544). If the estimated filter 132 soot load is not outside an allowable range or does not exceed some threshold value (Step 526), the control unit 140 may repeat the filter 132 soot load measurements (Step 528).

Figure 6:
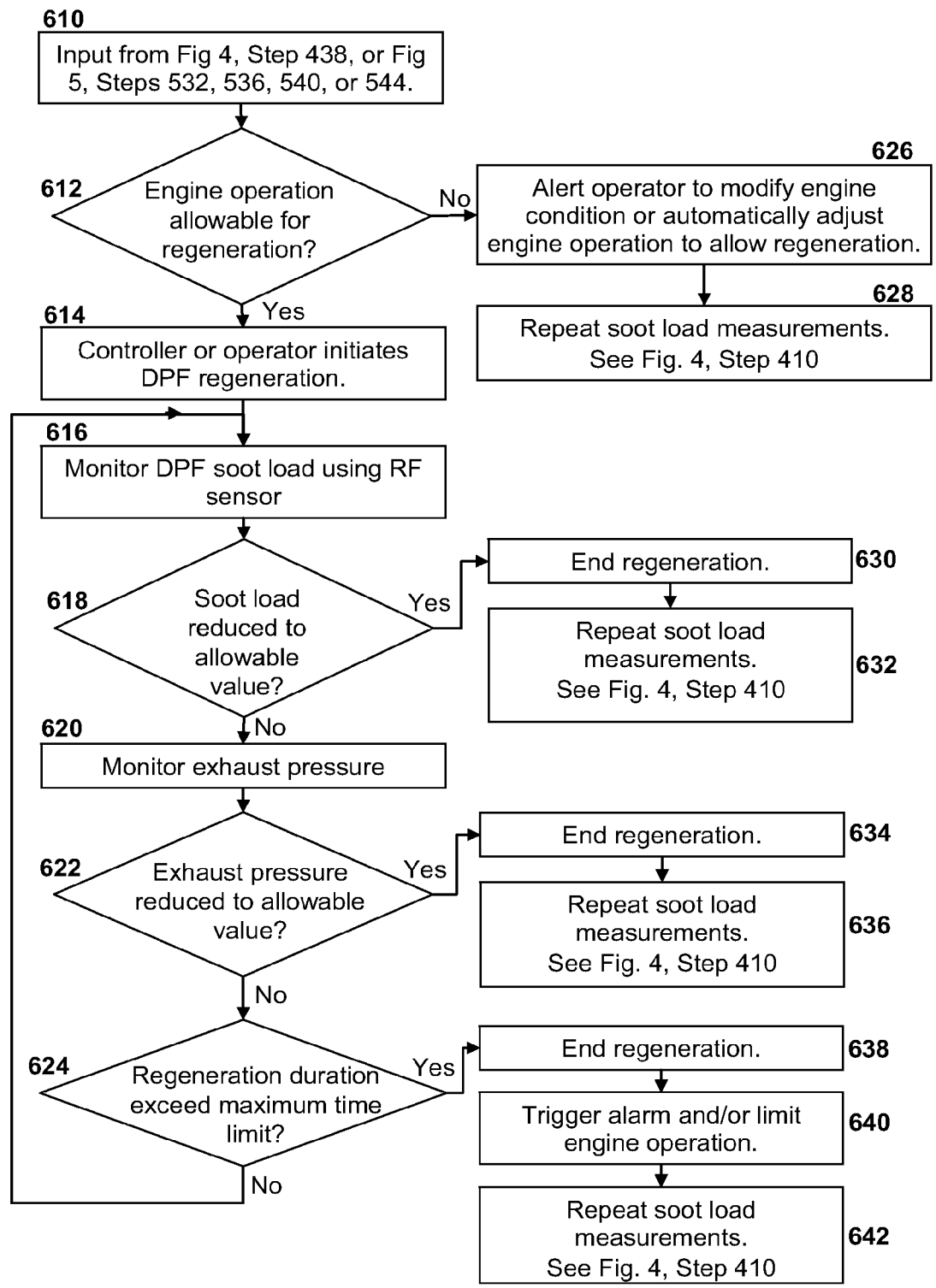
FIG. 6 is a flowchart illustrating the methodology to regenerate a filter according to an exemplary embodiment.

One method for regenerating a particulate filter 132 using the particulate filter control system 120 is illustrated in a flowchart shown in FIG. 6. The control unit 140 utilizes inputs from the filter 132 soot load measurements and engine 118 operation (Step 610) to determine if the engine 118 operating conditions and exhaust conditions are suitable for filter 132 regeneration (Step 612). If the engine 118 or exhaust conditions are not suitable for regeneration (Step 612), the control unit 140 may trigger an alarm 270 to alert the operator to modify engine 118 operation. Alternatively, the control unit 140 may automatically adjust engine 118 operation to allow for regeneration (Step 626). Following adjustment of engine 118 operation (Step 626), the control unit 140 may repeat the soot load measurements steps (Step 628). Alternatively, the control unit 140 may initiate regeneration (step 614).

If the engine 118 operation is suitable for filter 132 regeneration (Step 612), the control unit 140 or operator may initiate filter 132 regeneration (Step 614). The control unit 140 may monitor filter 132 soot levels using the RF filter load measurement system 288 (Step 616). If filter 132 soot levels are reduced to an allowable value (Step 618), the control unit 140 may end regeneration (Step 630) and repeat filter 132 soot load measurements (Step 632). Control unit 140 may also adjust filter 132 regeneration rate such as to reduce the time required for filter 132 regeneration or to prevent filter 132 temperatures from reaching or exceeding some threshold value.

If filter 132 soot levels are not reduced to an allowable value (Step 618), the control unit 140 may monitor exhaust pressure (Step 620). If exhaust pressure levels are reduced to an allowable value (Step 622), the control unit 140 may end regeneration (Step 634) and repeat filter 132 soot load measurements (Step 636).

If exhaust pressure levels are not reduced to an allowable value (Step 622), the control unit 140 may determine if the regeneration event has exceeded the maximum time limit (Step 624) as determined by the timing device 266. If the maximum allowable time limit for filter 132 regeneration has been exceeded (Step 624), the control unit 140 may end regeneration (Step 638), trigger an alarm 270 and/or limit engine 118 operation (Step 640), and repeat filter 132 soot load measurements (Step 642). If the regeneration event has not exceeded the maximum allowable time limit (Step 624), the control unit 140 may continue to monitor filter 132 soot loading and return to Step 616.

If an RF filter measurement system 288 is not used, the controller 140 would sequence from step 614 directly to step 620.

Figure 7:
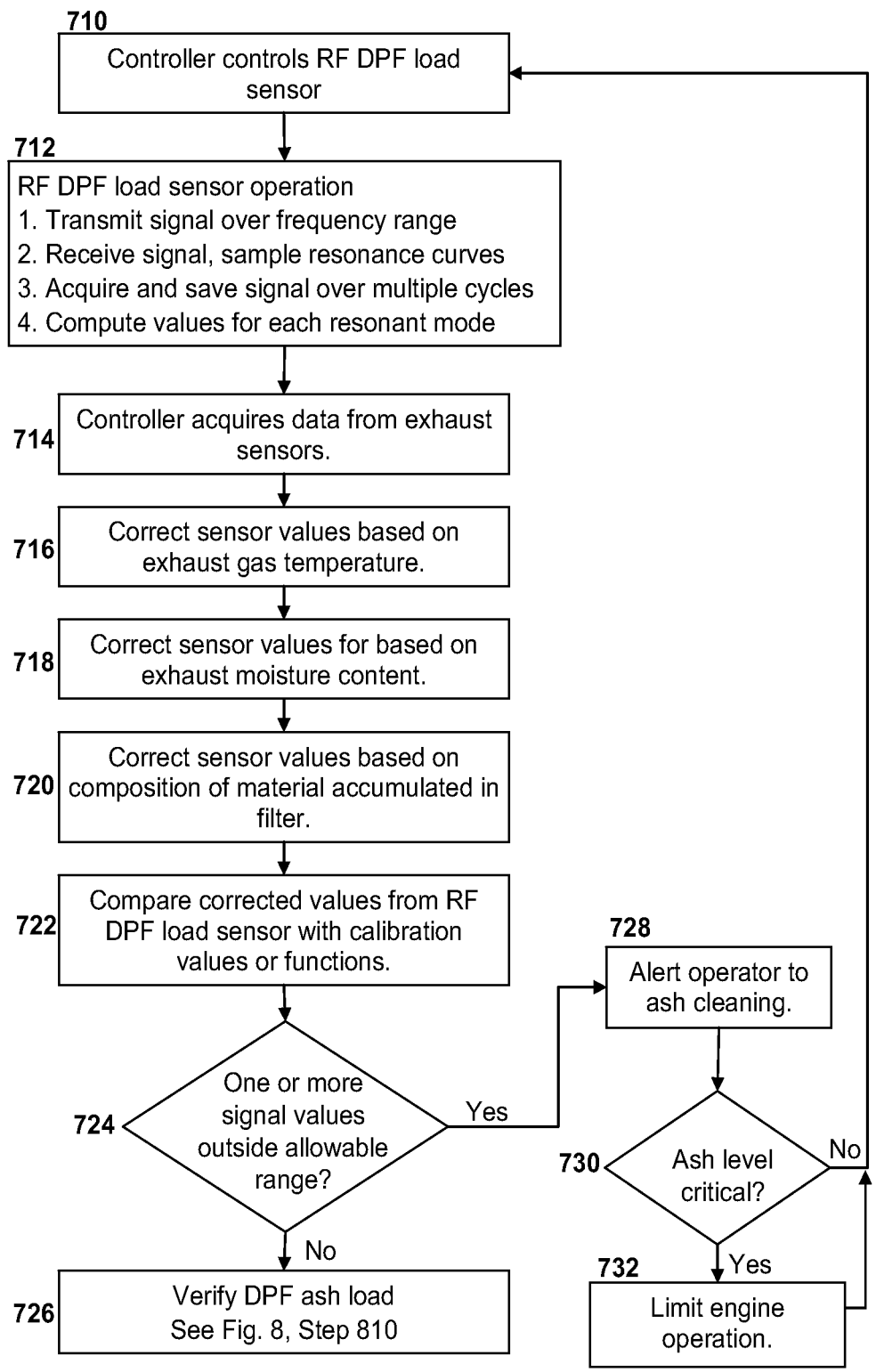
FIG. 7 is a flowchart illustrating the methodology to determine filter ash loading and initiate an action using a radio frequency-based sensor according to an exemplary embodiment.
Figure 8:
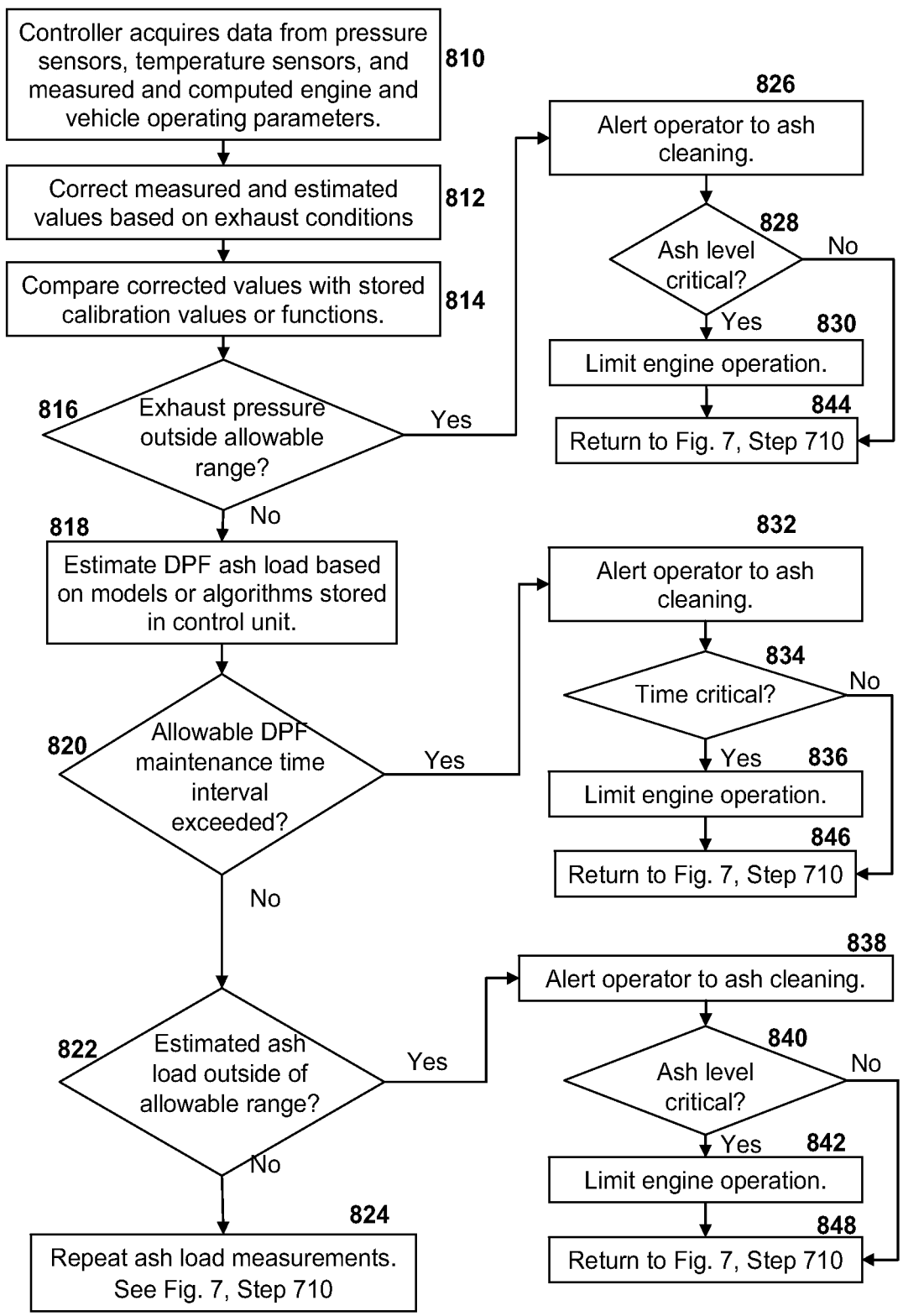
FIG. 8 is a flowchart illustrating the methodology to determine filter ash loading and initiate an action using exhaust gas sensors according to an exemplary embodiment.

One method of implementing the particulate filter control system 120 to measure filter 132 ash loading is illustrated in the flowcharts shown in FIG. 7 and FIG. 8. FIG. 7 assumes the use of a RF filter measurement system 288, while FIG. 8 assumes use of sensors. Either of these methods, or a combination of the two can be used to determine the ash loading. Referring to FIG. 7, the controller 140 may control the RF filter measurement system 288 (Step 710) which may consist of transmitting an RF signal through filter 132 over a frequency range sufficient to generate at least one resonant mode in cavity 130, receiving the transmitted signal and sampling the resonance curves, acquiring and saving the signal over one or more sweeps of the frequency range (cycles), and computing parameters and statistics for each resonant mode (Step 712). The signal parameters and statistics may include the frequency, width, amplitude, and quality factor of one or more resonant modes. Signal statistics may include the mean, median, standard deviation, and mode of each of the compute parameters as determined over one or more consecutive measurements. The resonance curves may also be averaged.

The controller 140 may then acquire data from additional sensors depicted in FIG. 2 (Step 714). Controller 140 may correct the RF filter load sensor 288 values based on exhaust gas temperature (Step 716), correct the RF filter load sensor 288 values based on exhaust moisture content (Step 718), and correct the RF filter load sensor 288 values based on the composition of the material accumulated in the filter 132 (Step 720). As described above, correction may be based on less than all of these parameters or sensors, or additional parameters or sensors. Following correction of the RF filter load sensor 288 data, controller 140 may compare the corrected values with stored calibration values, functions, or the results of predictive models (Step 722). If one or more signal parameters are outside an allowable range (Step 724) the control unit 140 will trigger an alarm 270 to alert the operator that the filter 132 requires ash cleaning or replacement (Step 728). If the filter 132 ash level exceeds a critical limit (Step 730), the control unit 140 may limit engine 118 operation to protect the engine 118 and after-treatment system 124 (Step 732). If the ash level does not exceed a critical level (Step 730), the control unit 140 will continue to monitor filter 132 ash levels and return to Step 710.

If the RF filter measurement system 288 values are not outside an allowable range (Step 724), the control unit 140 may continue to verify filter 132 ash levels (Step 726), if the system supports both RF and sensor based measurements.

Looking at FIG. 8, the controller 140 may acquire data from pressure sensors 212 and 238, temperature sensors 252, 216, 222, and 236, soot sensor 218, and other measured and computed engine 118 and machine 110 operating parameters (Step 810). The control unit 140 may correct the sensor measurements based on exhaust conditions (Step 812) and compare the measurements with reference or calibration values or functions (Step 814).

If the exhaust back-pressure or filter 132 pressure drop is outside an allowable range or exceeds some threshold value (Step 816), the control unit 140 may trigger an alarm 270 (Step 826) to alert the operator to clean or replace the filter 132. The exhaust pressure measurements may be determined following complete filter 132 regeneration or at any reference condition. The regeneration may be determined to be complete if filter 132 soot levels, as measured by the RF filter measurement system 288, are below some threshold value, or a predetermined time interval has elapsed. If the filter 132 ash level exceeds a critical limit (Step 828), the control unit 140 may limit engine 118 operation to protect the engine 118 and after-treatment system 124 (Step 830). If the ash level does not exceed a critical level (Step 828), the control unit 140 will continue to monitor filter 132 ash levels and return to Step 710.

If the exhaust back-pressure or filter 132 pressure drop is not outside an allowable range or does not exceed some threshold value (Step 816), the control unit 140 may estimate filter 132 ash levels using models or algorithms (Step 818). In one example, these algorithms may be as simple as comparing the elapsed time since the last filter 132 regeneration with the some threshold value being the maximum allowable time between filter 132 regenerations. In another example, the algorithms may be more sophisticated such as predictive models, also known as virtual sensors. These models may utilize measurements or knowledge of engine 118 air and fuel flow, engine 118 speed, and elapsed time since the last filter 132 ash cleaning, in addition to other parameters, to predict the amount of ash emitted by the engine 118 and collected on filter 132 over a period of time. In another example, the parameters listed above may be used by control unit 140 to estimate engine 118 oil consumption over a period of time, which may also be related to filter 132 ash levels.

If the allowable time interval between filter 132 maintenance or replacement has been exceeded as determined by the timing device 266 (Step 820), the control unit 140 may trigger an alarm 270 to alert the operator to clean or replace the filter 132 (Step 832). If the time interval exceeds a critical limit (Step 834), the control unit 140 may limit engine 118 operation to protect the engine 118 and after-treatment system 124 (Step 836). If the time interval does not exceed a critical level (Step 834), the control unit 140 will continue to monitor filter ash levels and return to Step 710.

If the estimated or computed filter 132 ash levels based on the algorithms and models executed in the control unit 140 are outside an allowable range (Step 822), the control unit 140 will trigger an alarm 270 to alert the operator that the filter 132 requires ash cleaning or replacement (Step 838). If the filter 132 ash level exceeds a critical limit (Step 840), the control unit 140 may limit engine 118 operation to protect the engine 118 and after-treatment system 124 (Step 842). If the ash level does not exceed a critical level (Step 840), the control unit 140 will continue to monitor filter 132 ash levels and return to Step 710. Further, if the estimated or computed filter 132 ash levels based on the algorithms and models executed in the control unit 140 are not outside an allowable range (Step 822), the control unit will repeat the ash load measurements and return to Step 710 (Step 824).

Figure 9:
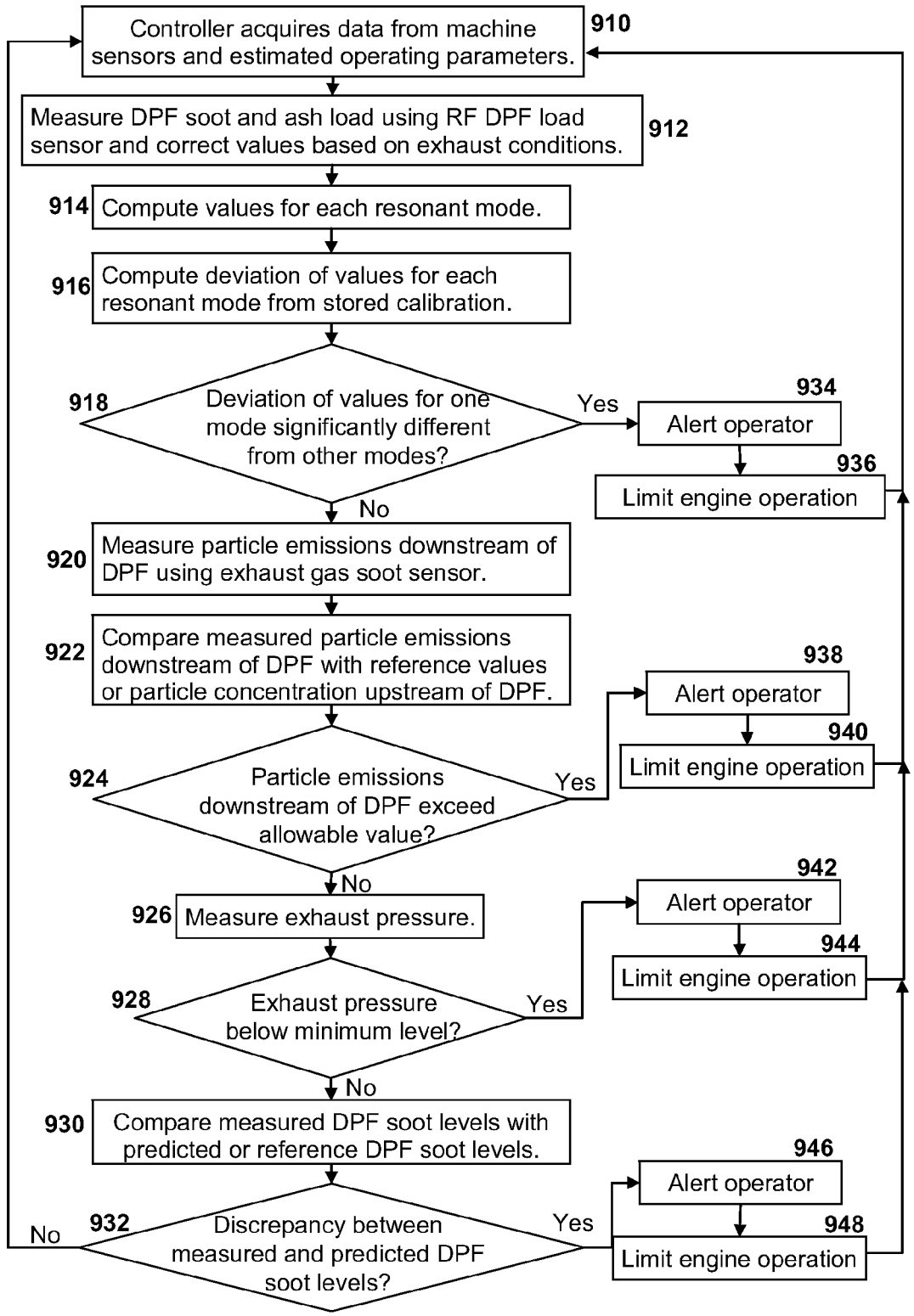
FIG. 9 is a flowchart illustrating the methodology to detect filter failures or malfunctions according to an exemplary embodiment.

One method of implementing the particulate filter control system 120 to detect filter 132 and system failures and malfunctions is illustrated in the flowchart shown in FIG. 9. The control unit 140 may acquire data from machine 110 sensors, engine 118 sensors, and after-treatment system 124 sensors and compute additional operating parameters (Step 910). The control unit 140 may then measure filter 132 soot and ash levels using the RF filter load measurement system 288 and correct the measured values based on exhaust conditions, such as temperature, moisture, and particulate matter composition, for example (Step 912). The control unit 140 may compute values and statistics for each resonant mode. The signal values and statistics may include the frequency, peak width, amplitude, and quality factor of one or more resonant modes. Signal statistics may include the mean, median, mode, and standard deviation of each of the computed parameters as determined over several consecutive measurements. The control unit 140 may then compute the deviation of the signal parameters and statistics for each resonant mode relative to a reference or calibration value (Step 916).

If the deviation of a signal value for one resonant mode differs significantly, more than a specified amount, from the deviation of the signal parameters and statistics of the other modes from their respective reference values (Step 918), then the control unit 140 may trigger an alarm 270 (Step 934). This condition may indicate uneven soot or ash distribution in the filter 132 due to the formation of a crack or localized melting, for example. Filter 132 failures may also be detected based on measurements from the RF catalyst monitoring system 290, if such measurements indicate particulate accumulation on catalyst 138.

In another example (not shown in FIG. 9), measurements from NOx sensors 254 and 248 may be used to determine malfunction of the NOx catalyst 138. Measurements from the RF catalyst monitoring system 290, may also be used to determine catalyst 138 failure modes such as face plugging by urea, for example. The control unit 140 may also limit engine 118 operation (Step 936) to prevent damage to the engine 118 or after-treatment system 124 or to prevent excessive emissions.

If the values measured by the RF filter measurement system 288 are not abnormal (Step 918), the control unit 140 may monitor particle emissions downstream of the particulate filter 132 using the exhaust gas soot sensor 234 (Step 920). The control unit 140 may compare the particle emissions measured downstream of the particulate filter 132 with the particle emissions entering the filter 132, as measured by the upstream exhaust gas soot sensor 218, or a reference value (Step 922). If the particle emissions downstream of the filter 132 exceed the allowable value (Step 924), then the control unit 140 may trigger an alarm 270 (Step 938). The control unit 140 may also limit engine 118 operation (Step 940) to prevent damage to the engine 118 or after-treatment system 124 or to prevent excessive emissions.

If the particle emissions measured by exhaust gas soot sensor 234 are not above the threshold limit (Step 924), the control unit 140 may measure exhaust pressure using sensors 212 and 238 (Step 926). If the exhaust pressure is below a minimum value (Step 928), then the control unit 140 may trigger an alarm 270 (Step 942). Low filter 132 pressure drop or exhaust backpressure may indicate a filter 132 failure. The control unit 140 may also limit engine 118 operation (Step 944) to prevent damage to the engine 118 or after-treatment system 124 or to prevent excessive emissions.

If the exhaust pressure measurements are not below the minimum acceptable value (Step 928), the control unit 140 may compare measured filter 132 soot levels using any of the above mentioned measurement techniques, with predicted filter 132 soot levels computed using models or algorithms stored in control unit 140. These models and algorithms were described in reference to FIG. 5, step 522. If a discrepancy exists between the measures and predicted filter 132 soot loading levels, beyond an allowable amount, (Step 932) the control unit 140 may trigger an alarm 270 (Step 946). The control unit 140 may also limit engine 118 operation (Step 948) to prevent damage to the engine 118 or after-treatment system 124 or to prevent excessive emissions. If no significant discrepancy is found (Step 932), the control unit 140 will continue to check for filter 132 failures and return to step 910.

As described above, if the RF filter measurement system 288 is not used, the controller will skip step 918 and proceed directly to step 920.

Figure 10:
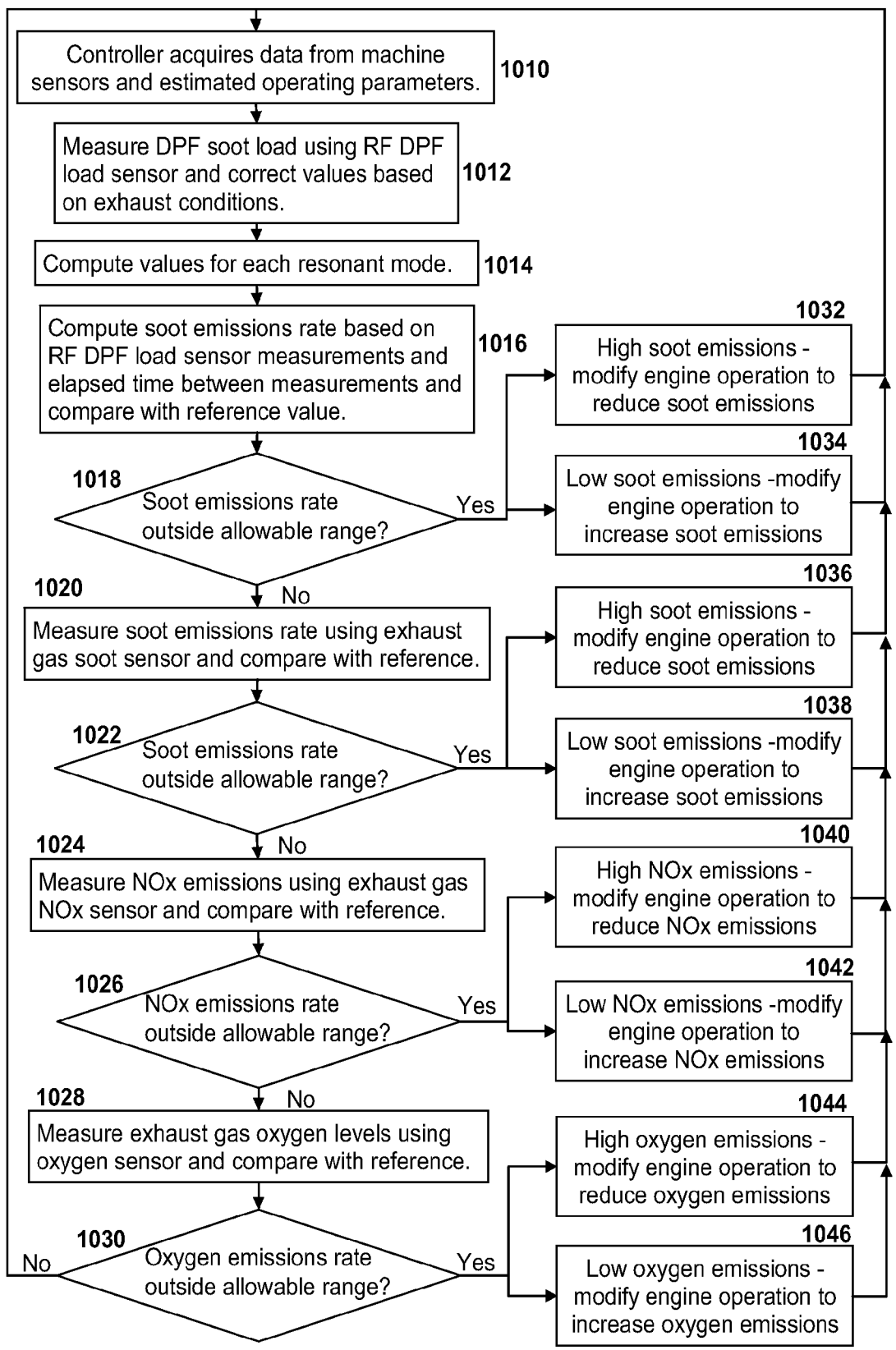
FIG. 10 is a flowchart illustrating the methodology to optimize engine and after-treatment system operation according to an exemplary embodiment.

One method of controlling engine 118 operation based on exhaust measurements from a particulate filter control system 120 and additional after-treatment system 124 sensors is illustrated in the flowchart shown in FIG. 10. The control unit 140 may acquire data from machine 110 sensors, engine 118 sensor, and after-treatment system 124 sensors and compute additional operating parameters (Step 1010). The control unit 140 may then measure filter 132 soot levels using the RF filter load measurement system 288 and correct the measured values based on exhaust conditions (Step 1012). The control unit 140 may compute values and statistics for each resonant mode (Step 1014). The signal values and statistics may include the frequency, peak width, amplitude, and quality factor of one or more resonant modes. Signal statistics may include the mean, median, mode, and standard deviation of each of the compute parameters as determined over one or more consecutive measurements or cycles.

The control unit 140 may then compute the soot emissions rate based on the time elapsed between two consecutive measurements of the RF filter load measurement sensor 288 as determined by the timing device 266 (Step 1016). The soot emissions rate, thus determined, may be compared with a reference value (Step 1016). If the soot emissions rate is outside an allowable range (Step 1018), the control unit 140 may initiate an action to modify engine 118 operation. If the measured soot emissions rate is too high, the control unit 140 may modify engine 118 operation to reduce the engine-out soot emissions (Step 1032). If the measured soot emissions rate is too low, the control unit 140 may modify engine 118 operation to increase the engine-out soot emissions (Step 1034). If the soot emissions rate, as determined using the RF filter load sensing system 288 is not outside an allowable range, the control unit 140 may measure soot emissions using the exhaust gas soot sensor 218 (Step 1020). Alternatively, if an RF filter load system 288 is not utilized, the controller will proceed to step 1020 from step 1010.

If the soot emissions rate is outside an allowable range (Step 1022), the control unit 140 may initiate an action to modify engine 118 operation. If the measured soot emissions rate is too high, the control unit 140 may modify engine 118 operation to reduce the engine-out soot emissions (Step 1036). If the measured soot emissions rate is too low, the control unit 140 may modify engine 118 operation to increase the engine-out soot emissions (Step 1038). If the soot emissions rate, as determined using exhaust gas soot sensor 218 is not outside an allowable range, the control unit 140 may measure NOx emissions using the exhaust NOx sensors 254 and 248 (Step 1024).

If the NOx emissions rate is outside an allowable range (Step 1026), the control unit 140 may initiate an action to modify engine 118 operation. If the measured NOx emissions rate is too high, the control unit 140 may modify engine 118 operation to reduce the engine-out NOx emissions (Step 1040). If the measured NOx emissions rate is too low, the control unit 140 may modify engine 118 operation to increase the engine-out NOx emissions (Step 1042). High levels of NOx emissions, downstream of catalyst 138 may also indicate a catalyst 138 failure or malfunction. If the NOx emissions rate, as determined using the NOx sensors 254 and 248 are not outside an allowable range, the control unit 140 may measure oxygen emissions using the exhaust oxygen sensor 214 (Step 1028).

If the oxygen emissions rate is outside an allowable range (Step 1030), the control unit 140 may initiate an action to modify engine 118 operation. If the measured oxygen emissions rate is too high, the control unit 140 may modify engine 118 operation to reduce the engine-out oxygen emissions (Step 1044). If the measured oxygen emissions rate is too low, the control unit 140 may modify engine 118 operation to increase the engine-out oxygen emissions (Step 1046). If the oxygen emissions rate, as determined using the oxygen sensor 214 is not outside an allowable range (Step 1030), the control unit 140 may repeat the measurements and return to Step 1010.

Control unit 140 may be configured to perform a series of diagnostic functions to determine if the RF filter measurement system 288 is functioning properly. If no signal or no resonant modes are detected by detector 228, for example, it may be an indication that either detector 228 or signal generator 226 has failed. The diagnostic function may be carried out, such as by sending a reference signal having known characteristics in one example. In another embodiment, a reference cavity may be provided as a means for determining whether or not the RF filter measurement system 288 and RF catalyst measurement system 290 are functioning properly.

Redundant measurements may also allow for the determination of sensor or system 120 malfunctions. For example, the control unit 140 may use redundant measurements to compare the output from two or more sensors. Measurements from temperature sensors 252, 216, 222, and 236, may be compared by the control unit 140 at a given condition. Significant deviation of any one temperature measurement may indicate a problem with that specific temperature sensor. Similar methods can be applied to verify correct operation of pressure sensors 212 and 238, and NOx sensors 254 and 248, for example.

In another embodiment, the control unit 140 may utilize two or more different measurement methods to measure the same parameter. For example the pressure sensors 212 and 238, soot sensor 218, RF filter load measurement system 288 may each be used to independently measure filter 132 soot load. Deviation of soot load measurements by any one of these methods from the others, by a certain factor, may indicate sensor malfunction.

The control system 140 may also compare output for any of the sensors shown in FIG. 2 to a known value at a particular reference condition as another means for detecting sensor malfunction.

Accordingly, the particulate filter control system of the various embodiments described herein can be used to monitor particulate filter soot and ash levels, as well as initiate, control and end filter regeneration, detect filter failures and malfunctions, and provide information to control engine operation based on exhaust measurements. Furthermore, the particulate filter control system has additional advantages.

The particulate filter control system monitors not only total filter loading levels, but also the spatial distribution of the material accumulated in the filter, thus permitting filter regeneration to be triggered based on either the local filter load level exceeding some threshold value or the total average filter load exceeding a maximum allowable level. In some cases, it may be desirable to regenerate the filter when the local material loading level exceeds some maximum value in order to prevent filter failures and malfunctions that may occur when the local filter temperature exceeds a safe level.

The present system simultaneously detects both soot and ash accumulation in the filter over all exhaust conditions.

The present system is capable of carrying out diagnostic functions to detect filter malfunctions and failures that would cause particles to escape or pass through the filter and exceed the regulated requirements. The system allows execution of diagnostic routines to ensure all exhaust system critical sensors are operating properly.

The present system maintains a number of correction functions and calibrations to correct the measurement values and reduce measurement error due to exhaust temperature effects, moisture content, and variations in the composition of the material accumulated in the filter.

The present system communicates with existing engine and exhaust sensors to provide feedback control capabilities useful to modify engine operation to optimize the combined engine and after-treatment system performance.

While the above description contains much specificity, this should not be construed as limiting the scope of any embodiment, but as exemplifications of the presently preferred embodiments thereof. Many other ramifications and variations are possible within the teachings of the various embodiments. For example, the after-treatment system configuration and layout may easily be modified from that described herein and alternative embodiments may or may not include all of the sensors and may or may not employ all of the methods of operating the system described in this disclosure.

It will also be apparent to those skilled in the art that the present disclosure relates not only a particulate filter load monitoring and control systems, but any type of filter, such as air filters, liquid filters, filter bag houses, and the like, where knowledge of filter loading, by contaminant matter or any other material, and control of filter operation are important.

Thus the scope of the invention should be determined by the appended claims and their legal equivalents, and not by the examples given.

What is claimed is:

1. A method of controlling filter operation, comprising:
providing a filter element configured to remove contaminant matter from a flow contained in a filter housing forming a radio frequency resonant cavity, and a filter load monitoring system, comprising at least one probe configured to transmit radio frequency signals through the resonant cavity and filter medium, at least one probe configured to receive radio frequency signals transmitted through the resonant cavity and filter medium, at least one sensor configured to monitor flow characteristics, and a control unit;
transmitting radio frequency signals through said resonant cavity and filter medium across a frequency range sufficient to generate at least one resonant mode, where said at least one resonant mode corresponds to a spatial distribution of material in said filter;
receiving radio frequency signals transmitted through said resonant cavity and filter medium across a frequency range sufficient to generate at least one resonant mode;
monitoring at least one additional flow characteristic;
determining, based on the radio frequency resonant curves, the amount of material in said filter; and
initiating an action based on the amount of material in said filter, or input from one or more exhaust sensors.

2. The method of claim 1, wherein said at least one additional flow characteristic is selected from the group consisting of temperature, pressure, soot content, moisture content, flow rate, and gas composition.

3. The method of claim 1, further comprising:
providing a timing device contained in said control unit;
estimating a change in the amount of said material in said filter over a period of time.

4. The method of claim 3, wherein the estimated change in the amount of said material in said filter is used to determine the amount of soot addition to said filter, the amount of soot oxidation on said filter, or the amount of soot passing through said filter over said period of time.

5. The method of claim 3, wherein said estimated change in the amount of said material in said filter is compared with estimates from models or additional sensors, or is used to improve the accuracy of models or additional sensors.

6. The method of claim 3, wherein said estimating the change in the amount of said material in said filter provides a measure of engine-out soot emissions or soot leakage from the filter.

7. The method of claim 1, wherein one of said one or more exhaust sensors comprises a temperature sensor, and wherein the amount of said soot in said filter that is oxidized is estimated using said control unit, based on input from said temperature sensor.

8. The method of claim 1, wherein said filter element is coated with at least one catalyst.

9. The method of claim 1, further comprising an exhaust after-treatment system, comprising said filter element and a catalyst element, wherein said control unit further detects failures or malfunctions of the engine or said exhaust aftertreatment system or is used to control the operation of the engine or said exhaust aftertreatment system.

10. The method of claim 1, wherein said initiating an action includes starting, ending or controlling filter regeneration, triggering an alarm or fault condition, or modifying engine or filter operation.

11. The method of claim 1, further comprising:
providing an exhaust aftertreatment system, comprising said filter housing and at least one catalyst element, wherein said catalyst element is contained in said filter housing.

12. The method of claim 1, further comprising:
providing an exhaust aftertreatment system, comprising said filter housing and at least one catalyst element, wherein said catalyst element is contained in a catalyst housing forming a radio frequency resonant cavity;
transmitting radio frequency signals through said catalyst housing and catalyst element across a frequency range sufficient to generate at least one resonant mode; and
receiving radio frequency signals through said catalyst housing and catalyst element across a frequency range sufficient to generate at least one resonant mode.

* * * * *